United States Patent
Dai et al.

(10) Patent No.: US 9,936,468 B2
(45) Date of Patent: Apr. 3, 2018

(54) METHOD FOR CONTOLLING UPLINK TRANSMIT POWER IN INTER-BASE STATION CARRIER AGGREGATION, BASE STATION, AND DEVICE

(71) Applicant: Huawei Technologies Co., Ltd., Shenzhen (CN)

(72) Inventors: Mingzeng Dai, Shanghai (CN); Jian Zhang, Shanghai (CN); Qufang Huang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 14/921,941

(22) Filed: Oct. 23, 2015

(65) Prior Publication Data
US 2016/0044611 A1   Feb. 11, 2016

Related U.S. Application Data

(63) Continuation of application No. PCT/CN2013/074689, filed on Apr. 25, 2013.

(51) Int. Cl.
*H04W 52/36* (2009.01)
*H04W 52/14* (2009.01)
(Continued)

(52) U.S. Cl.
CPC ......... *H04W 52/367* (2013.01); *H04W 24/10* (2013.01); *H04W 52/146* (2013.01);
(Continued)

(58) Field of Classification Search
CPC . H04W 52/367; H04W 52/146; H04W 24/10; H04W 72/044; H04W 52/346; H04W 52/40

See application file for complete search history.

(56) References Cited

U.S. PATENT DOCUMENTS 8,954,064 B2 * 2/2015 Baldemair ............ H04L 5/0053
455/434
2010/0273515 A1 10/2010 Fabien et al.
(Continued)

FOREIGN PATENT DOCUMENTS

CN   102083131 A   6/2011
CN   102469058 A   5/2012
(Continued)

OTHER PUBLICATIONS

LTE, "3rd Generation Partnership Project; Technical Specification Group Access Network; Evolved Universal Terrestrial Radio Access (E-UTRA); Medium Access Control (MAC) Protocol Specification (Release 11)," 3GPP TS 36.321 v11.2.0, Mar. 2013, 56 pages.

(Continued)

*Primary Examiner* — Ajay Cattungal
(74) *Attorney, Agent, or Firm* — Slater Matsil, LLP

(57) ABSTRACT

Embodiments provide a method for controlling an uplink transmit power in inter-base station carrier aggregation. The method includes acquiring, by a first base station, a maximum uplink transmit power that is allocated by user equipment (UE) to the first base station, and configuring, by the first base station, an uplink transmit power for the UE according to the maximum uplink transmit power. In the method, because the maximum transmit power allocated to the first base station is allocated according to status information of an uplink resource of a second base station, a power that is allocated by the UE to each base station can be coordinated.

24 Claims, 10 Drawing Sheets

A first base station acquires a maximum uplink transmit power that is allocated by UE to the first base station, where the maximum uplink transmit power is determined according to a status of an uplink resource that is scheduled by a second base station for the UE — 101

The first base station configures an uplink transmit power for the UE according to the maximum uplink transmit power — 102

(51) Int. Cl.
- H04W 24/10 (2009.01)
- H04W 72/04 (2009.01)
- H04W 52/34 (2009.01)
- H04W 52/40 (2009.01)

(52) U.S. Cl.
CPC ........ H04W 72/044 (2013.01); *H04W 52/346* (2013.01); *H04W 52/40* (2013.01)

(56) References Cited

U.S. PATENT DOCUMENTS

| | | | |
|---|---|---|---|
| 2012/0087306 A1* | 4/2012 | Kim | H04W 52/365 370/328 |
| 2012/0176979 A1 | 7/2012 | Kim et al. | |
| 2013/0028117 A1* | 1/2013 | Montojo | H04L 5/001 370/252 |
| 2013/0058315 A1* | 3/2013 | Feuersanger | H04W 52/281 370/336 |
| 2013/0136015 A1* | 5/2013 | Ojala | H04L 5/001 370/252 |
| 2013/0215824 A1 | 8/2013 | Wang et al. | |
| 2013/0286990 A1* | 10/2013 | Park | H04L 1/1861 370/329 |
| 2014/0016555 A1 | 1/2014 | Zhao et al. | |
| 2014/0022967 A1* | 1/2014 | Yang | H04L 1/1861 370/280 |
| 2015/0005027 A1* | 1/2015 | Zeng | H04W 72/1278 455/522 |
| 2015/0043492 A1* | 2/2015 | Baek | H04W 76/025 370/329 |
| 2015/0163794 A1* | 6/2015 | Liang | H04W 72/042 370/329 |

FOREIGN PATENT DOCUMENTS

| | | |
|---|---|---|
| EP | 2523414 A1 | 11/2012 |
| GB | 2445989 A | 7/2008 |
| WO | 2010106227 A1 | 9/2010 |
| WO | 2012002684 A2 | 1/2012 |
| WO | 2012060921 A1 | 5/2012 |

OTHER PUBLICATIONS

LTE, "3rd Generation Partnership Project; Technical Specification Group Access Network; Evolved Universal Terrestrial Radio Access (E-UTRA); Radio Resource Control (RRC); Protocol Specification (Release 11)," 3GPP TS 36.331 v11.3.0, Mar. 2013, 344 pages.

LTE, "3rd Generation Partnership Project; Technical Specification Group Radio Access Network; Evolved Universal Terrestrial Radio Access Network (E-UTRAN); X2 Application Protocol (X2AP) (Release 11)," 3GPP TS 36.423 v11.4.0, Mar. 2013, 144 pages.

* cited by examiner

A first base station acquires a maximum uplink transmit power that is allocated by UE to the first base station, where the maximum uplink transmit power is determined according to a status of an uplink resource that is scheduled by a second base station for the UE ~ 101

The first base station configures an uplink transmit power for the UE according to the maximum uplink transmit power ~ 102

FIG. 1

A first base station receives, from a second base station or UE, semi-persistent scheduling configuration information that is scheduled by the second base station for the UE ~ 201

The first base station determines, according to the semi-persistent scheduling configuration information that is scheduled by the second base station for the UE, a maximum uplink transmit power that is allocated by the UE to the first base station ~ 202

The first base station acquires a power headroom of the UE that is recalculated according to the maximum uplink transmit power ~ 203

The first base station configures an uplink transmit power for the UE according to the maximum uplink transmit power allocated by the UE to the first base station, a maximum uplink transmit power of each carrier, and the power headroom ~ 204

FIG. 2

METHOD FOR CONTOLLING UPLINK TRANSMIT POWER IN INTER-BASE STATION CARRIER AGGREGATION, BASE STATION, AND DEVICE

This application is a continuation of International Application No. PCT/CN2013/074689, filed on Apr. 25, 2013, which is hereby incorporated by reference in its entirety.

TECHNICAL FIELD

Embodiments relate to wireless communications technologies, and in particular, to a method for controlling an uplink transmit power in inter-base station carrier aggregation, a base station, and a device.

BACKGROUND

With development of mobile communications technologies, the 3rd Generation Partnership Project (3GPP for short) imposes higher requirements on a peak data rate and a system bandwidth and the like. To satisfy the requirements, carrier aggregation (CA for short) is introduced in a 3GPP Long Term Evolution Advanced (LTE-A for short) system. CA may acquire a higher bandwidth by aggregating multiple contiguous or non-contiguous component carriers (CC for short), thereby increasing the peak data rate and a system throughput. In a carrier aggregation system, when user equipment (UE for short) works on multiple carriers, an eNB is allowed to schedule a part or all of the carriers for the UE to perform uplink transmission simultaneously. In this case, for proper scheduling by the eNB, the UE needs to report its power headroom (PH for short).

CCs in CA may be provided by a same base station (called intra-base station CA), or may also be provided by different base stations (called inter-base station CA). In an existing LTE-A standard, for intra-base station CA, after a power headroom report (PHR for short) is triggered, the UE sends the PHR in any serving cell, where the PHR includes information such as a power headroom reserved for each serving cell. The base station receives the PHR, and may estimate a downlink path loss of the UE in each serving cell and coordinate uplink resource allocation of each serving cell. For inter-base station CA, after a PHR is triggered, the PHR sent by the UE in any serving cell can be received by only one of the base stations, and a base station receiving the PHR does not know an allocation status of uplink resources of other base stations and cannot coordinate an uplink resource of each serving cell. Consequently, a problem of transmission resource waste and low transmission efficiency is caused.

SUMMARY

Embodiments provide a method for controlling an uplink transmit power in inter-base station carrier aggregation, a base station, and a device, so as to avoid waste of uplink resources scheduled by a base station for UE and improve transmission efficiency.

A first aspect provides a method for controlling an uplink transmit power in inter-base station carrier aggregation. The method includes acquiring, by a first base station, a maximum uplink transmit power that is allocated by user equipment UE to the first base station, where the maximum uplink transmit power is determined according to a status of an uplink resource that is scheduled by a second base station for the UE; and configuring, by the first base station, an uplink transmit power for the UE according to the maximum uplink transmit power.

In a first possible implementation manner of the first aspect, the first base station is a secondary base station, and the second base station is a master base station.

With reference to the first aspect and the first possible implementation manner of the first aspect, in a second possible implementation manner of the first aspect, the acquiring, by a first base station, a maximum uplink transmit power that is allocated by UE to the first base station, includes receiving, by the first base station, from the second base station or the UE, the status of the uplink resource that is scheduled by the second base station for the UE; and determining, by the first base station, according to the status of the uplink resource that is scheduled by the second base station for the UE, the maximum uplink transmit power that is allocated by the UE to the first base station.

With reference to the first aspect and the first possible implementation manner of the first aspect, in a third possible implementation manner of the first aspect, the acquiring, by a first base station, a maximum uplink transmit power that is allocated by UE to the first base station, includes receiving, by the first base station, from the second base station or the UE, the maximum uplink transmit power that is allocated by the UE to the first base station, where the maximum uplink transmit power is determined by the second base station or the UE according to the status of the uplink resource that is scheduled by the second base station for the UE.

With reference to the second or third possible implementation manner of the first aspect, in a fourth possible implementation manner of the first aspect, the status of the uplink resource is semi-persistent scheduling configuration information of the uplink resource that is scheduled for the UE when the second base station establishes a voice service for the UE.

In a fifth possible implementation manner of the first aspect, the semi-persistent scheduling configuration information includes a semi-persistent scheduling configuration command, a semi-persistent scheduling SPS configuration deletion command, a semi-persistent scheduling SPS activation instruction, and a semi-persistent scheduling SPS deactivation instruction.

With reference to the second possible implementation manner of the first aspect, in a sixth possible implementation manner of the first aspect, the determining, by the first base station, according to the status of the uplink resource that is scheduled by the second base station for the UE, the maximum uplink transmit power that is allocated by the UE to the first base station, includes determining, by the first base station, an offset of an uplink transmit power according to the status of the uplink resource that is scheduled by the second base station for the UE; and adding, by the first base station, the offset to an initial maximum uplink transmit power that is allocated by the UE to the first base station, and determining that a sum of the offset and the initial maximum uplink transmit power is the maximum uplink transmit power allocated by the UE to the first base station.

In a seventh possible implementation manner of the first aspect, the determining, by the first base station, an offset of an uplink transmit power according to the status of the uplink resource that is scheduled by the second base station for the UE, includes determining, by the first base station, the offset of the uplink transmit power when identifying, according to the status of the uplink resource that is scheduled by the second base station for the UE, that an uplink resource scheduled by the second base station for the UE at a current time point is lower than a set threshold.

In an eighth possible implementation manner of the first aspect, a value of the offset is preconfigured.

With reference to the first aspect and the first and second possible implementation manners of the first aspect, in a ninth possible implementation manner of the first aspect, after the allocating, by the first base station, an uplink transmit power to the UE according to the maximum uplink transmit power, the method further includes, when the uplink transmit power determined by the first base station changes compared with a historical value, or when a variation exceeds a preset threshold, acquiring a power headroom of the UE that is recalculated according to the maximum uplink transmit power.

With reference to the first aspect and the first to ninth possible implementation manners of the first aspect, in a tenth possible implementation manner of the first aspect, the method further includes receiving, by the first base station, preset power information sent by the second base station, where the preset power information includes at least an uplink transmit power that is preconfigured by the second base station at a next time point for the UE; and determining, by the first base station, according to the preset power information, an uplink transmit power that is configured by the first base station at the next time point for the UE.

In an eleventh possible implementation manner of the first aspect, the preset power information includes a maximum transmit power of the UE, a maximum transmit power allocated by the UE to the second base station, an uplink control information scheduling status of the UE, a maximum transmit power allocated by the UE to each carrier of the second base station, and an offset of an uplink transmit power used by the second base station.

With reference to the first aspect and the first to eleventh possible implementation manners of the first aspect, in a twelfth possible implementation manner of the first aspect, the method further includes acquiring, by the first base station, the initial maximum uplink transmit power that is allocated by the UE to the first base station, where the initial maximum uplink transmit power is determined according to a downlink path loss or an uplink path loss between each base station and the UE; and allocating, by the first base station, the uplink transmit power to the UE according to the initial maximum uplink transmit power.

In a thirteenth possible implementation manner of the first aspect, the acquiring, by the first base station, the initial maximum uplink transmit power that is allocated by the UE to the first base station, includes receiving, by the first base station, the initial maximum uplink transmit power that is allocated by the UE to the first base station and reported by the UE, where the initial maximum uplink transmit power is allocated by the UE from the maximum uplink transmit power of the UE according to a proportion of the downlink path loss between each base station and the UE.

With reference to the twelfth possible implementation manner of the first aspect, in a fourteenth possible implementation manner of the first aspect, the acquiring, by the first base station, the initial maximum uplink transmit power that is allocated by the UE to the first base station, includes receiving, by the first base station, the initial maximum uplink transmit power that is allocated by the UE to the first base station and sent by the second base station, where the initial maximum uplink transmit power is allocated by the second base station from the maximum uplink transmit power of the UE according to a proportion of the downlink path loss between each base station and the UE.

With reference to the twelfth possible implementation manner of the first aspect, in a fifteenth possible implementation manner of the first aspect, the acquiring, by the first base station, the initial maximum uplink transmit power that is allocated by the UE to the first base station, includes receiving, by the first base station, the downlink path loss of each base station that is reported by the UE; and obtaining, by the first base station by calculation, from the maximum uplink transmit power of the UE and according to a proportion of each downlink path loss, the initial maximum uplink transmit power that is allocated by the UE to the first base station.

With reference to the twelfth possible implementation manner of the first aspect, in a sixteenth possible implementation manner of the first aspect, the acquiring, by the first base station, the initial maximum uplink transmit power that is allocated by the UE to the first base station, includes acquiring, by the first base station, the uplink path loss between each base station and the UE that is sent by the second base station; and obtaining, by the first base station by calculation, from the maximum uplink transmit power of the UE and according to a proportion of each uplink path loss, the initial maximum uplink transmit power that is allocated by the UE to the first base station.

In a seventeenth possible implementation manner of the first aspect, the first base station receives a sounding reference signal sent by the UE; the first base station determines an uplink path loss between the first base station and the UE according to a receive power and a transmit power of the sounding reference signal; and the first base station reports the uplink path loss between the first base station and the UE to the second base station, so that the second base station forwards the uplink path loss to other base stations.

With reference to the twelfth to seventeenth possible implementation manners of the first aspect, in an eighteenth possible implementation manner of the first aspect, after the acquiring, by the first base station, the initial maximum uplink transmit power that is allocated by the UE to the first base station, the method further includes adding, by the first base station, a supplementary offset to the initial maximum uplink transmit power.

With reference to the twelfth to eighteenth possible implementation manners of the first aspect, in a nineteenth possible implementation manner of the first aspect, the acquiring, by the first base station, the initial maximum uplink transmit power that is allocated by the UE to the first base station, includes acquiring, by the first base station, according to a set period, or when the uplink path loss or downlink path loss changes, or when a path loss variation exceeds a set threshold, the initial maximum uplink transmit power that is allocated by the UE to the first base station.

A second aspect provides a method for controlling an uplink transmit power in inter-base station carrier aggregation, including providing, by a second base station for a first base station, a status of an uplink resource that is scheduled by the second base station for user equipment UE, so that the first base station determines, according to the status of the uplink resource that is scheduled by the second base station for the UE, a maximum uplink transmit power that is allocated by the UE to the first base station; and scheduling, by the second base station, the uplink resource for the UE according to the status of the uplink resource.

In a first possible implementation manner of the second aspect, the first base station is a secondary base station, and the second base station is a master base station.

With reference to the second aspect and the first possible implementation manner of the second aspect, in a second possible implementation manner of the second aspect, the providing, by a second base station for a first base station, a status of an uplink resource that is scheduled by the second base station for the UE, includes sending, by the second base station, the status of the uplink resource that is scheduled by the second base station for the UE, to the first base station; or sending, by the second base station, the status of the uplink resource that is scheduled by the second base station for the UE, to the first base station through the UE.

In a third possible implementation manner of the second aspect, the sending, by the second base station, the status of the uplink resource that is scheduled by the second base station for the UE, to the first base station through the UE, includes sending, by the second base station, the status of the uplink resource that is scheduled by the second base station for the UE, to the UE by using a media access control element (MAC) control element (CE), a radio resource control RRC message, or uplink control information, so that the UE sends the status of the uplink resource to the first base station.

With reference to the second aspect and the first possible implementation manner of the second aspect, in a fourth possible implementation manner of the second aspect, the providing, by a second base station for a first base station, a status of an uplink resource that is scheduled by the second base station for the UE, includes, when establishing a voice service for the UE, configuring, by the second base station, semi-persistent scheduling of the uplink resource for the UE; and sending, by the second base station, semi-persistent scheduling configuration information to the first base station, or sending semi-persistent scheduling configuration information to the UE, so that the UE sends the semi-persistent scheduling configuration information to the first base station.

In a fifth possible implementation manner of the second aspect, the semi-persistent scheduling configuration information includes a semi-persistent scheduling SPS configuration command, an SPS configuration deletion command, an SPS activation instruction, and an SPS deactivation instruction.

With reference to the second aspect and the first to fifth possible implementation manners of the second aspect, in a sixth possible implementation manner of the second aspect, the method further includes configuring, by the second base station, preset power information, where the preset power information includes at least an uplink transmit power that is preconfigured by the second base station at a next time point for the UE; and sending, by the second base station, the preset power information to the first base station, so that the first base station determines, according to the preset power information, an uplink transmit power that is configured by the first base station at the next time point for the UE.

In a seventh possible implementation manner of the second aspect, the preset power information includes a maximum transmit power of the UE, a maximum transmit power allocated by the UE to the second base station, an uplink control information scheduling status of the UE, a maximum transmit power allocated by the UE to each carrier of the second base station, and an offset of an uplink transmit power used by the second base station.

With reference to the second aspect and the first to seventh possible implementation manners of the second aspect, in an eighth possible implementation manner of the second aspect, the method further includes acquiring, by the second base station, an initial maximum uplink transmit power that is allocated by the UE to the second base station, where the initial maximum uplink transmit power is determined according to a downlink path loss or an uplink path loss between each base station and the UE; and allocating, by the second base station, an uplink transmit power to the UE according to the initial maximum uplink transmit power.

In a ninth possible implementation manner of the second aspect, the acquiring, by the second base station, an initial maximum uplink transmit power that is allocated by the UE to the second base station, includes receiving, by the second base station, the initial maximum uplink transmit power that is allocated by the UE to the second base station and reported by the UE, where the initial maximum uplink transmit power is allocated by the UE from the maximum uplink transmit power of the UE according to a proportion of the downlink path loss between each base station and the UE.

With reference to the eighth possible implementation manner of the second aspect, in a tenth possible implementation manner of the second aspect, the method further includes receiving, by the second base station, an initial maximum uplink transmit power that is allocated by the UE to each base station and reported by the UE; or receiving, by the second base station, the downlink path loss of each base station that is reported by the UE, and obtaining by calculation, from the maximum uplink transmit power of the UE according to a proportion of each downlink path loss, an initial maximum uplink transmit power that is allocated by the UE to each base station; and sending, by the second base station, each initial maximum uplink transmit power to a corresponding base station.

With reference to the eighth possible implementation manner of the second aspect, in an eleventh possible implementation manner of the second aspect, the acquiring, by the second base station, an initial maximum uplink transmit power that is allocated by the UE to the second base station, includes acquiring, by the second base station, the uplink path loss between each base station and the UE that is sent by each base station; obtaining, by the second base station by calculation, from the maximum uplink transmit power of the UE and according to a proportion of each uplink path loss, an initial maximum uplink transmit power that is allocated by the UE to each base station; and sending, by the second base station, each initial maximum uplink transmit power to a corresponding base station.

In a twelfth possible implementation manner of the second aspect, the method further includes: receiving, by the second base station, a sounding reference signal sent by the UE; and determining, by the second base station, an uplink path loss between the second base station and the UE according to a receive power and a transmit power of the sounding reference signal.

With reference to the tenth to twelfth possible implementation manners of the second aspect, in a thirteenth possible implementation manner of the second aspect, after the obtaining, by the second base station, an initial maximum uplink transmit power that is allocated by the UE to each base station, the method further includes adding, by the second base station, a supplementary offset to an initial maximum uplink transmit power that is allocated to the secondary base station.

With reference to the eighth to thirteenth possible implementation manners of the second aspect, in a fourteenth possible implementation manner of the second aspect, the acquiring, by the second base station, an initial maximum uplink transmit power that is allocated by the UE to the second base station, includes acquiring, by the second base station, according to a set period, or when the uplink path loss or downlink path loss changes, or when a path loss variation exceeds a set threshold, the initial maximum uplink transmit power that is allocated by the UE to the second base station.

A third aspect provides a method for controlling an uplink transmit power in inter-base station carrier aggregation. The method includes acquiring, by user equipment UE, a status of an uplink resource that is scheduled by a second base station for the UE; and reporting, by the UE, the status of the uplink resource that is scheduled by the second base station for the UE, to a first base station, so that the first base station determines, according to the status of the uplink resource, a maximum uplink transmit power that is allocated by the UE to the first base station; or determining, by the UE, according to the status of the uplink resource that is scheduled by the second base station for the UE, a maximum uplink transmit power that is allocated by the UE to the first base station, and reporting the maximum uplink transmit power to the first base station.

In a first possible implementation manner of the third aspect, the first base station is a secondary base station, and the second base station is a master base station.

With reference to the third aspect and the first possible implementation manner of the third aspect, in a second possible implementation manner of the third aspect, the determining, by the UE, according to the status of the uplink resource that is scheduled by the second base station for the UE, a maximum uplink transmit power that is allocated by the UE to the first base station, includes determining, by the UE, an offset of an uplink transmit power according to the status of the uplink resource that is scheduled by the second base station for the UE; and adding, by the UE, the offset to an initial maximum uplink transmit power that is allocated by the UE to the first base station, and determining that a sum of the offset and the initial maximum uplink transmit power is the maximum uplink transmit power allocated by the UE to the first base station.

In a third possible implementation manner of the third aspect, a value of the offset is preconfigured, or is delivered by the second base station by using network signaling.

With reference to the third aspect and the first to third possible implementation manners of the third aspect, in a fourth possible implementation manner of the third aspect, the method further includes receiving, by the UE, the status that is of the uplink resource and is sent by using a media access control element MAC CE, a radio resource control RRC message, or uplink control information by the second base station; or receiving, by the UE, a semi-persistent scheduling SPS configuration command, an SPS configuration deletion command, an SPS activation instruction, and an SPS deactivation instruction that are sent by the second base station, and using the commands and instructions as the status of the uplink resource; or identifying, by the UE, whether the second base station does not schedule the uplink resource within a set time, and determining the status of the uplink resource according to an identification result.

With reference to the third aspect and the first to fourth possible implementation manners of the third aspect, in a fifth possible implementation manner of the third aspect, the method further includes reporting, by the UE, a downlink path loss between the UE and a base station to the base station, so that the base station determines, according to the downlink path loss, an initial maximum uplink transmit power that is allocated by the UE to the base station; or determining, by the UE, according to a downlink path loss between the UE and a base station, an initial maximum uplink transmit power that is allocated by the UE to the base station, and reporting the initial maximum uplink transmit power to the base station.

In a sixth possible implementation manner of the third aspect, the reporting, by the UE, a downlink path loss between the UE and a base station to the base station, includes measuring, by the UE, a downlink path loss between the UE and each base station, and reporting, by the UE, the downlink path loss between the UE and each base station to the second base station.

With reference to the fifth possible implementation manner of the third aspect, in a seventh possible implementation manner of the third aspect, the determining, by the UE, according to a downlink path loss between the UE and a base station, an initial maximum uplink transmit power that is allocated by the UE to the base station, and reporting the initial maximum uplink transmit power to the base station, includes measuring, by the UE, a downlink path loss between the UE and each base station; and obtaining, by the UE by calculation, from a maximum uplink transmit power of the UE and according to a proportion of the downlink path loss between the UE and each base station, an initial maximum uplink transmit power allocated to each base station; and reporting, by the UE, the determined initial maximum uplink transmit power to each base station, or reporting the determined initial maximum uplink transmit power to the second base station, so that the second base station forwards the determined initial maximum uplink transmit power to each base station.

With reference to the sixth or seventh possible implementation manner of the third aspect, in an eighth possible implementation manner of the third aspect, the measuring, by the UE, a downlink path loss between the UE and each base station, includes receiving, by the UE, a sounding reference signal sent by each base station, and determining the downlink path loss between the UE and each base station according to a receive power and a transmit power of the sounding reference signal.

With reference to the seventh possible implementation manner of the third aspect, in a ninth possible implementation manner of the third aspect, after the obtaining, by the UE by calculation, from a maximum uplink transmit power of the UE and according to a proportion of the downlink path loss between the UE and each base station, an initial maximum uplink transmit power allocated to each base station, the method further includes adding, by the UE, a supplementary offset to the maximum uplink transmit power that is allocated to the first base station.

With reference to the fifth to ninth possible implementation manners of the third aspect, in a tenth possible implementation manner of the third aspect, the UE acquires, according to a set period, or when the uplink path loss or downlink path loss changes, or when a path loss variation exceeds a set threshold, the initial maximum uplink transmit power that is allocated by the UE to each base station.

A fourth aspect provides a first base station, including a power acquiring module, configured to acquire a maximum uplink transmit power that is allocated by user equipment UE to the first base station, where the maximum uplink transmit power is determined according to a status of an uplink resource that is scheduled by a second base station for the UE; and a power determining module, configured to configure an uplink transmit power for the UE according to the maximum uplink transmit power.

In a first possible implementation manner of the fourth aspect, the first base station is a secondary base station, and the second base station is a master base station.

With reference to the fourth aspect and the first possible implementation manner of the fourth aspect, in a second possible implementation manner of the fourth aspect, the power acquiring module includes an uplink resource status receiving unit, configured to receive, from the second base station or the UE, the status of the uplink resource that is scheduled by the second base station for the UE; and an uplink transmit power determining unit, configured to determine, according to the status of the uplink resource that is scheduled by the second base station for the UE, the maximum uplink transmit power that is allocated by the UE to the first base station.

With reference to the fourth aspect and the first possible implementation manner of the fourth aspect, in a third possible implementation manner of the fourth aspect, the power acquiring module is specifically configured to receive, from the second base station or the UE, the maximum uplink transmit power that is allocated by the UE to the first base station, where the maximum uplink transmit power is determined by the second base station or the UE according to the status of the uplink resource that is scheduled by the second base station for the UE.

With reference to the second or third possible implementation manner of the fourth aspect, in a fourth possible implementation manner of the fourth aspect, the status of the uplink resource is semi-persistent scheduling configuration information of the uplink resource that is scheduled for the UE when the second base station establishes a voice service for the UE.

In a fifth possible implementation manner of the fourth aspect, the semi-persistent scheduling configuration information includes a semi-persistent scheduling SPS configuration command, an SPS configuration deletion command, an SPS activation instruction, and an SPS deactivation instruction.

With reference to the second possible implementation manner of the fourth aspect, in a sixth possible implementation manner of the fourth aspect, the power determining module includes a power offset determining unit, configured to determine an offset of an uplink transmit power according to the status of the uplink resource that is scheduled by the second base station for the UE; and a power determining unit, configured to add the offset to an initial maximum uplink transmit power that is allocated by the UE to the first base station, and determine that a sum of the offset and the initial maximum uplink transmit power is the maximum uplink transmit power allocated by the UE to the first base station.

In a seventh possible implementation manner of the fourth aspect, the power offset determining unit is specifically configured to determine the offset of the uplink transmit power when identifying, according to the status of the uplink resource that is scheduled by the second base station for the UE, that an uplink resource scheduled by the second base station for the UE at a current time point is lower than a set threshold.

In an eighth possible implementation manner of the fourth aspect, a value of the offset is preconfigured.

With reference to the fourth aspect and the first and second possible implementation manners of the fourth aspect, in a ninth possible implementation manner of the fourth aspect of the present invention, the base station further includes a power headroom determining module, configured to: when the uplink transmit power determined by the first base station changes compared with a historical value, or when a variation exceeds a preset threshold, acquire a power headroom of the UE that is recalculated according to the maximum uplink transmit power.

With reference to the fourth aspect and the first to ninth possible implementation manners of the fourth aspect, in a tenth possible implementation manner of the fourth aspect, the base station further includes a preset power receiving module, configured to receive preset power information sent by the second base station, where the preset power information includes at least an uplink transmit power that is preconfigured by the second base station at a next time point for the UE; and a preset power configuring module, configured to determine, according to the preset power information, an uplink transmit power that is configured by the first base station at the next time point for the UE.

In an eleventh possible implementation manner of the fourth aspect, the preset power information includes a maximum transmit power of the UE, a maximum transmit power allocated by the UE to the second base station, an uplink control information scheduling status of the UE, a maximum transmit power allocated by the UE to each carrier of the second base station, and an offset of an uplink transmit power used by the second base station.

With reference to the fourth aspect and the first to eleventh possible implementation manners of the fourth aspect, in a twelfth possible implementation manner of the fourth aspect, the base station further includes an initial maximum uplink transmit power acquiring module, configured to acquire the initial maximum uplink transmit power that is allocated by the UE to the first base station, where the initial maximum uplink transmit power is determined according to a downlink path loss or an uplink path loss between each base station and the UE; and a power allocating module, configured to allocate an uplink transmit power to the UE according to the initial maximum uplink transmit power.

In a thirteenth possible implementation manner of the fourth aspect, the initial maximum uplink transmit power acquiring module is specifically configured to receive the initial maximum uplink transmit power that is allocated by the UE to the first base station and reported by the UE, where the initial maximum uplink transmit power is allocated by the UE from the maximum uplink transmit power of the UE according to a proportion of the downlink path loss between each base station and the UE.

With reference to the twelfth possible implementation manner of the fourth aspect, in a fourteenth possible implementation manner of the fourth aspect, the initial maximum uplink transmit power acquiring module is specifically configured to receive the initial maximum uplink transmit power that is allocated by the UE to the first base station and sent by the second base station, where the initial maximum uplink transmit power is allocated by the second base station from the maximum uplink transmit power of the UE according to a proportion of the downlink path loss between each base station and the UE.

With reference to the twelfth possible implementation manner of the fourth aspect, in a fifteenth possible implementation manner of the fourth aspect, the initial maximum uplink transmit power acquiring module is specifically configured to receive the downlink path loss of each base station that is reported by the UE, and obtain by calculation, from the maximum uplink transmit power of the UE and according to a proportion of each downlink path loss, the initial maximum uplink transmit power that is allocated by the UE to the first base station.

With reference to the twelfth possible implementation manner of the fourth aspect, in a sixteenth possible implementation manner of the fourth aspect, the initial maximum uplink transmit power acquiring module is specifically configured to acquire the uplink path loss between each base station and the UE that is sent by the second base station, and obtain by calculation, from the maximum uplink transmit power of the UE and according to a proportion of each uplink path loss, the initial maximum uplink transmit power that is allocated by the UE to the first base station.

In a seventeenth possible implementation manner of the fourth aspect, in claim 64, the base station according to claim 63 further includes a reference signal receiving module, configured to receive a sounding reference signal sent by the UE; an uplink path loss determining module, configured to determine an uplink path loss between the first base station and the UE according to a receive power and a transmit power of the sounding reference signal; and a path loss reporting module, configured to report the uplink path loss between the first base station and the UE to the second base station, so that the second base station forwards the uplink path loss to other base stations.

With reference to the twelfth to seventeenth possible implementation manners of the fourth aspect, in an eighteenth possible implementation manner of the fourth aspect, the initial maximum uplink transmit power acquiring module is further configured to add a supplementary offset to the initial maximum uplink transmit power after acquiring the initial maximum uplink transmit power that is allocated by the UE to the first base station.

With reference to the twelfth to eighteenth possible implementation manners of the fourth aspect, in a nineteenth possible implementation manner of the fourth aspect, the initial maximum uplink transmit power acquiring module is configured to acquire, according to a set period, or when the uplink path loss or downlink path loss changes, or when a path loss variation exceeds a set threshold, the initial maximum uplink transmit power that is allocated by the UE to the first base station.

A fifth aspect provides a second base station, including an uplink resource status providing module, configured to provide, for a first base station, a status of an uplink resource that is scheduled by the second base station for user equipment UE, so that the first base station determines, according to the status of the uplink resource that is scheduled by the second base station for the UE, a maximum uplink transmit power that is allocated by the UE to the first base station; and an uplink resource scheduling module, configured to schedule the uplink resource for the UE according to the status of the uplink resource.

In a first possible implementation manner of the fifth aspect, the first base station is a secondary base station, and the second base station is a master base station.

With reference to the fifth aspect and the first possible implementation manner of the fifth aspect, in a second possible implementation manner of the fifth aspect, the uplink resource status providing module is specifically configured to send the status of the uplink resource that is scheduled by the second base station for the UE, to the first base station; or send the status of the uplink resource that is scheduled by the second base station for the UE, to the first base station through the UE.

In a third possible implementation manner of the fifth aspect, the uplink resource status providing module is specifically configured to send the status of the uplink resource that is scheduled by the second base station for the UE, to the UE by using a media access control element MAC CE, a radio resource control RRC message, or uplink control information, so that the UE sends the status of the uplink resource to the first base station.

With reference to the fifth aspect and the first possible implementation manner of the fifth aspect, in a fourth possible implementation manner of the fifth aspect, the uplink resource status providing module is specifically configured to, when establishing a voice service for the UE, configure semi-persistent scheduling of the uplink resource for the UE, and send semi-persistent scheduling configuration information to the first base station, or send semi-persistent scheduling configuration information to the UE, so that the UE sends the semi-persistent scheduling configuration information to the first base station.

In a fifth possible implementation manner of the fifth aspect, the semi-persistent scheduling configuration information includes a semi-persistent scheduling SPS configuration command, an SPS configuration deletion command, an SPS activation instruction, and an SPS deactivation instruction.

With reference to the fifth aspect and the first to fifth possible implementation manners of the fifth aspect, in a sixth possible implementation manner of the fifth aspect, the base station further includes a preset power configuring module, configured to configure preset power information, where the preset power information includes at least an uplink transmit power that is preconfigured by the second base station at a next time point for the UE; and a preset power information sending module, configured to send the preset power information to the first base station, so that the first base station determines, according to the preset power information, an uplink transmit power that is configured by the first base station at the next time point for the UE.

In a seventh possible implementation manner of the fifth aspect, the preset power information includes a maximum transmit power of the UE, a maximum transmit power allocated by the UE to the second base station, an uplink control information scheduling status of the UE, a maximum transmit power allocated by the UE to each carrier of the second base station, and an offset of an uplink transmit power used by the second base station.

With reference to the fifth aspect and the first to seventh possible implementation manners of the fifth aspect, in an eighth possible implementation manner of the fifth aspect, the base station further includes an initial maximum uplink transmit power acquiring module, configured to acquire an initial maximum uplink transmit power that is allocated by the UE to the second base station, where the initial maximum uplink transmit power is determined according to a downlink path loss or an uplink path loss between each base station and the UE; and a power allocating module, configured to allocate an uplink transmit power to the UE according to the initial maximum uplink transmit power.

In a ninth possible implementation manner of the fifth aspect, the initial maximum uplink transmit power module is specifically configured to receive the initial maximum uplink transmit power that is allocated by the UE to the second base station and reported by the UE, where the initial maximum uplink transmit power is allocated by the UE from the maximum uplink transmit power of the UE according to a proportion of the downlink path loss between each base station and the UE.

With reference to the eighth possible implementation manner of the fifth aspect, in a tenth possible implementation manner of the fifth aspect, the initial maximum uplink transmit power acquiring module is specifically configured to receive an initial maximum uplink transmit power that is allocated by the UE to each base station and reported by the UE; or receive the downlink path loss of each base station that is reported by the UE, and obtain by calculation, from the maximum uplink transmit power of the UE and according to a proportion of each downlink path loss, an initial maximum uplink transmit power that is allocated by the UE to each base station. The base station further includes an initial maximum uplink transmit power sending module, configured to send each initial maximum uplink transmit power to a corresponding base station.

With reference to the eighth possible implementation manner of the fifth aspect, in an eleventh possible implementation manner of the fifth aspect, the initial maximum uplink transmit power acquiring module includes an uplink path loss acquiring unit, configured to acquire the uplink path loss between each base station and the UE that is sent by each base station; and an initial maximum uplink transmit power allocating unit, configured to obtain by calculation, from the maximum uplink transmit power of the UE and according to a proportion of each uplink path loss, an initial maximum uplink transmit power that is allocated by the UE to each base station; and the initial maximum uplink transmit power sending module is configured to send each initial maximum uplink transmit power to a corresponding base station.

In a twelfth possible implementation manner of the fifth aspect, the base station further includes a reference signal receiving module, configured to receive a sounding reference signal sent by the UE; and an uplink path loss determining module, configured to determine an uplink path loss between the second base station and the UE according to a receive power and a transmit power of the sounding reference signal.

With reference to the tenth to twelfth possible implementation manners of the fifth aspect, in a thirteenth possible implementation manner of the fifth aspect, the initial maximum uplink transmit power acquiring module is further configured to add a supplementary offset to an initial maximum uplink transmit power that is allocated to the secondary base station after obtaining the initial maximum uplink transmit power that is allocated by the UE to each base station.

With reference to the eighth to thirteenth possible implementation manners of the fifth aspect, in a fourteenth possible implementation manner of the fifth aspect, the initial maximum uplink transmit power acquiring module acquires, according to a set period, or when the uplink path loss or downlink path loss changes, or when a path loss variation exceeds a set threshold, the initial maximum uplink transmit power that is allocated by the UE to the second base station.

A sixth aspect provides user equipment UE, including an uplink resource status acquiring module, configured to acquire a status of an uplink resource that is scheduled by a second base station for the UE; and an uplink resource status reporting module, configured to report the status of the uplink resource that is scheduled by the second base station for the UE, to a first base station, so that the first base station determines, according to the status of the uplink resource, a maximum uplink transmit power that is allocated by the UE to the first base station; or determine, according to the status of the uplink resource that is scheduled by the second base station for the UE, a maximum uplink transmit power that is allocated by the UE to the first base station, and report the maximum uplink transmit power to the first base station.

In a first possible implementation manner of the sixth aspect, the first base station is a secondary base station, and the second base station is a master base station.

With reference to the sixth aspect and the first possible implementation manner of the sixth aspect, in a second possible implementation manner of the sixth aspect, the uplink resource status reporting module includes: a power offset determining unit, configured to determine an offset of an uplink transmit power according to the status of the uplink resource that is scheduled by the second base station for the UE; and a transmit power determining unit, configured to add the offset to an initial maximum uplink transmit power that is allocated by the UE to the first base station, and determine that a sum of the offset and the initial maximum uplink transmit power is the maximum uplink transmit power allocated by the UE to the first base station.

In a third possible implementation manner of the sixth aspect, a value of the offset is preconfigured, or is delivered by the second base station by using network signaling.

With reference to the sixth aspect and the first to third possible implementation manners of the sixth aspect, in a fourth possible implementation manner of the sixth aspect, the uplink resource status acquiring module is specifically configured to receive the status that is of the uplink resource and is sent by using a media access control element MAC CE, a radio resource control RRC message, or uplink control information by the second base station; or receive a semi-persistent scheduling SPS configuration command, an SPS configuration deletion command, an SPS activation instruction, and an SPS deactivation instruction that are sent by the second base station, and use the commands and instructions as the status of the uplink resource; or identify whether the second base station does not schedule the uplink resource within a set time, and determine the status of the uplink resource according to an identification result.

With reference to the sixth aspect and the first to fourth possible implementation manners of the sixth aspect, in a fifth possible implementation manner of the sixth aspect, the UE further includes an uplink path loss reporting module and an initial maximum uplink transmit power determining module, where the uplink path loss reporting module is configured to report a downlink path loss between the UE and a base station to the base station, so that the base station determines, according to the downlink path loss, an initial maximum uplink transmit power that is allocated by the UE to the base station; and the initial maximum uplink transmit power determining module is configured to determine, according to a downlink path loss between the UE and a base station, an initial maximum uplink transmit power that is allocated by the UE to the base station, and report the initial maximum uplink transmit power to the base station.

In a sixth possible implementation manner of the sixth aspect, the uplink path loss reporting module includes a downlink path loss measuring unit, configured to measure a downlink path loss between the UE and each base station; and a downlink path loss reporting unit, configured to report the downlink path loss between the UE and each base station to the second base station.

With reference to the fifth possible implementation manner of the sixth aspect, in a seventh possible implementation manner of the sixth aspect, the initial maximum uplink transmit power determining module includes a downlink path loss measuring unit, configured to measure a downlink path loss between the UE and each base station; an initial maximum uplink transmit power allocating unit, configured to obtain by calculation, from a maximum uplink transmit power of the UE, an initial maximum uplink transmit power that is allocated to each base station; and an initial maximum uplink transmit power reporting unit, configured to report the determined initial maximum uplink transmit power to each base station, or report the determined initial maximum uplink transmit power to the second base station, so that the second base station forwards the determined initial maximum uplink transmit power to each base station.

With reference to the sixth or seventh possible implementation manner of the sixth aspect, in an eighth possible implementation manner of the sixth aspect, the downlink path loss measuring unit is specifically configured to receive a sounding reference signal sent by each base station, and determine the downlink path loss between the UE and each base station according to a receive power and a transmit power of the sounding reference signal.

With reference to the seventh possible implementation manner of the sixth aspect, in a ninth possible implementation manner of the sixth aspect, the initial maximum uplink transmit power allocating unit is further configured to add a supplementary offset to the maximum uplink transmit power that is allocated to the first base station.

With reference to the fifth to ninth possible implementation manners of the sixth aspect, in a tenth possible implementation manner of the sixth aspect, the initial maximum uplink transmit power determining module acquires, according to a set period, or when the uplink path loss or downlink path loss changes, or when a path loss variation exceeds a set threshold, the initial maximum uplink transmit power that is allocated by the UE to each base station.

A seventh aspect provides a first base station, including a processor and a memory, where: the memory stores an execution instruction; when the first base station runs, the processor communicates with the memory; and the processor executes the execution instruction so that the first base station executes the method according to the first aspect and any one of the first to nineteenth possible implementation manners of the first aspect.

An eighth aspect provides a second base station, including a processor and a memory, where: the memory stores an execution instruction; when the second base station runs, the processor communicates with the memory; and the processor executes the execution instruction so that the second base station executes the method according to the second aspect and any one of the first to thirteenth possible implementation manners of the second aspect.

A ninth aspect provides user equipment UE, including a processor and a memory, where: the memory stores an execution instruction; when the UE runs, the processor communicates with the memory; and the processor executes the execution instruction so that the UE executes the method according to the third aspect and any one of the first to ninth possible implementation manners of the third aspect.

In a method provided by an embodiment, when a first base station allocates a transmit power to UE, the first base station performs allocation according to a maximum transmit power that is allocated by the UE to the first base station. Because the maximum transmit power allocated to the first base station is allocated according to status information of an uplink resource of a second base station, a power that is allocated by the UE to each base station can be coordinated. Therefore, the first base station can accurately allocate an uplink transmit power to the UE, and a throughput of the UE is increased while requirements of multiple base stations for transmit powers are satisfied.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1 is a flowchart of Embodiment 1 of a method for controlling an uplink transmit power in inter-base station carrier aggregation according to an embodiment;

FIG. 2 is a flowchart of Embodiment 2 of a method for controlling an uplink transmit power in inter-base station carrier aggregation according to an embodiment;

DETAILED DESCRIPTION OF ILLUSTRATIVE EMBODIMENTS

Figure 3:
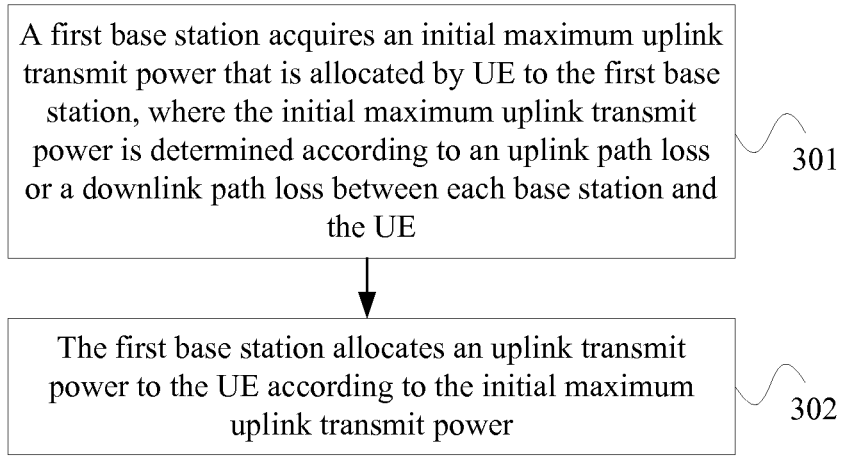
FIG. 3 is a flowchart of Embodiment 3 of a method for controlling an uplink transmit power in inter-base station carrier aggregation according to an embodiment.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

FIG. 1 is a flowchart of Embodiment 1 of a method for controlling an uplink transmit power in inter-base station carrier aggregation. In the embodiment, UE may receive data from multiple cells of two base stations simultaneously, where there are a master base station and a secondary base station. The master base station has a function of main control, and controls selection of a secondary base station, a data offload policy, and the like; the secondary base station mainly has a function of data offload and is configured to increase data traffic. Generally, inter-base station carrier aggregation may include a master base station and multiple secondary base stations. In this embodiment, the master base station and the secondary base station are only logical concepts. In a process of establishing a connection by UE, a master base station and a secondary base station are distinguished for the UE. However, from a perspective of a base station itself, the base station may be either a master base station or a secondary base station for different UEs, and can either execute a function of a master base station or execute a function of a secondary base station. The concepts about the master base station and the secondary base station in this embodiment are also applicable to other embodiments. The method provided by the present invention is executed by an apparatus for controlling an uplink transmit power in inter-base station carrier aggregation, where the apparatus is integrated in a base station. The method provided by this embodiment includes the following steps.

Step 101: A first base station acquires a maximum uplink transmit power that is allocated by UE to the first base station, where the maximum uplink transmit power is determined according to a status of an uplink resource that is scheduled by a second base station for the UE.

In this embodiment, that a first base station acquires a maximum uplink transmit power that is allocated by UE to the first base station is specifically that the first base station receives, from the second base station or the UE, the status of the uplink resource that is scheduled by the second base station for the UE, and the first base station determines, according to the status of the uplink resource that is scheduled by the second base station for the UE, the maximum uplink transmit power that is allocated by the UE to the first base station. Alternatively, the first base station receives, from the second base station or the UE, the maximum uplink transmit power that is allocated by the UE to the first base station, where the maximum uplink transmit power is determined by the second base station or the UE according to the status of the uplink resource that is scheduled by the second base station for the UE.

The status of the uplink resource may be semi-persistent scheduling configuration information of the uplink resource that is scheduled for the UE when the second base station establishes a voice service for the UE. The semi-persistent scheduling configuration information may include a semi-persistent scheduling (SPS for short) configuration command, an SPS configuration deletion command, an SPS activation instruction, and an SPS deactivation instruction.

The status information of the uplink resource may also be the status that is of the uplink resource and is sent by using a media access control element MAC CE for short), a radio resource control (RRC for short) message, or uplink control information by the second base station. Specifically, the second base station may decide, according to a sending status of uplink data, not to schedule uplink data of the UE in a period of time. Therefore, the status of the uplink resource includes a time and an indication of not scheduling uplink data by the second base station, or not scheduling uplink control information of the UE, such as a physical uplink control channel (PUCCH for short). The UE can allocate the maximum uplink transmit power to the first base station properly according to the status of the uplink resource of the second base station. Specifically, because the second base station does not schedule uplink data in a period of time, a part or all of a transmit power allocated previously to the second base station may be allocated to the first base station, so as to increase a transmit power of the first base station.

Step 102: The first base station configures an uplink transmit power for the UE according to the maximum uplink transmit power.

After acquiring the maximum uplink transmit power allocated by the UE, the first base station configures the uplink transmit power for the UE properly according to the maximum uplink transmit power allocated by the UE, and controls the uplink transmit power allocated to the UE not to exceed a maximum uplink transmit power of the UE, or properly reduces a transmit power of the UE.

In the method provided by this embodiment, when a first base station allocates a transmit power to UE, the first base station performs allocation according to a maximum transmit power that is allocated by the UE to the first base station. Because the maximum transmit power allocated to the first base station is allocated according to status information of an uplink resource of a second base station, a power that is allocated by the UE to each base station can be coordinated. Therefore, the first base station can accurately allocate an uplink transmit power to the UE, and a throughput of the UE is increased while requirements of multiple base stations for transmit powers are satisfied. Because statuses of uplink resources configured by other base stations are considered between base stations, a phenomenon of waste of the allocated uplink transmit power may be reduced, and even avoided, thereby improving transmission efficiency.

In this embodiment, the first base station may be a secondary base station, and the second base station may be a master base station. The secondary base station allocates an uplink transmit power according to a status of an uplink resource of the master base station. However, in an actual application, a contrary case may occur; the master base station may also allocate an uplink transmit power according to a status of an uplink resource of the secondary base station, or multiple secondary base stations mutually consider statuses of uplink resources of other base stations.

FIG. 2 is a flowchart of Embodiment 2 of a method for controlling an uplink transmit power in inter-base station carrier aggregation. In this embodiment, a first base station is a secondary base station, and a second base station is a master base station. However, persons skilled in the art may understand that it is also applicable that the first base station is a master base station and the second base station is a secondary base station. This embodiment provides a method for allocating, in a semi-persistent manner, an uplink transmit power of UE between base stations. The method provided by this embodiment specifically includes the following steps.

Step 201: A first base station receives, from a second base station or UE, semi-persistent scheduling configuration information that is scheduled by the second base station for the UE.

In this embodiment, a status of an uplink resource that is scheduled by the second base station for the UE is semi-persistent scheduling (SPS) configuration information of the uplink resource that is scheduled for the UE when the second base station establishes a voice service for the UE. The semi-persistent scheduling configuration information includes an SPS configuration command, an SPS configuration deletion command, an SPS activation instruction, and an SPS deactivation instruction.

A semi-persistent scheduling manner is generally applied to a real-time service whose data packet size is relatively fixed and whose arrival time interval satisfies a rule, for example, a voice (Voice over Internet Protocol, VoIP for short) service implemented by sending IP data packets. In initial scheduling, a base station indicates current scheduling information to the UE by using a physical downlink control channel (PDCCH for short). The UE identifies semi-persistent scheduling, and therefore stores the current scheduling information, and sends or receives the service data in a same time-frequency resource position at an interval of a fixed period. Semi-persistent scheduling transmission may fully use a feature of periodic arrival of a voice data packet, and a resource is granted for periodic use, which may save a PDCCH resource that is used by an LTE system for a scheduling instruction. In an initial phase of service establishment, RRC configures related semi-persistent scheduling parameters, such as a semi-persistent transmission time interval, a radio network identifier of a semi-persistent cell, and an uplink transmit power.

Using a typical VoIP service as an example, an arrival period of a data packet of the VoIP service is 20 ms; therefore, the base station provides a semi-persistent scheduling instruction for the UE by using a PDCCH; the UE transmits or receives, according to the instruction of the PDCCH, data scheduled at a current time point, and after an interval of 20 ms, transmits or receives a newly arrived VoIP data packet in a same time-frequency resource position.

In this embodiment, the second base station delivers an SPS configuration. When establishing a VoIP bearer, the second base station delivers the SPS configuration to the UE by using an RRC reconfiguration message, and meanwhile may send the SPS configuration to the first base station by using an interface message between the second base station and the first base station, where the SPS configuration may include a semi-persistent transmission time interval, a radio network identifier of a semi-persistent scheduling cell (SPS-C-RNTI), an uplink transmit power, and the like.

After acquiring the SPS configuration, the first base station further needs to acquire an SPS status, where the SPS status includes two states, activation/deactivation. The first base station parses the received semi-persistent configuration information to acquire the SPS status. The following uses a specific example to describe how the first base station acquires the SPS status.

The UE parses the PDCCH by using the SPS-C-RNTI, to acquire an SPS activation instruction, and provides the SPS activation instruction to the first base station, or the second base station sends an SPS activation instruction to the first base station when delivering the SPS activation instruction to the UE.

For the SPS deactivation state, the UE has two manners, implicit deactivation and explicit deactivation, where the implicit deactivation means that the UE itself decides deactivation according to an actual requirement, and the explicit deactivation means that the UE executes a deactivation operation only after receiving a deactivation instruction sent by the second base station. When the UE performs implicit deactivation, the UE directly sends an SPS deactivation instruction to the first base station. When the UE performs explicit deactivation, the second base station also sends an SPS deactivation instruction to the first base station when sending the SPS deactivation instruction to the UE.

The second base station may further cancel a semi-persistent scheduling manner by delivering an SPS configuration deletion command. When the UE receives the SPS configuration deletion command delivered by the second base station, where the SPS configuration deletion command is generally included in an RRC reconfiguration message, the UE may send the SPS configuration deletion command to the first base station, or when the second base station delivers the SPS configuration deletion command to the UE, the second base station also delivers the SPS configuration deletion command to the first base station, indicating to the first base station that the SPS configuration is released.

In this embodiment, the UE may send various types of SPS instruction information to the first base station by using a newly defined MAC CE or RRC message. The second base station sends various types of instruction information to the first base station by using interface messages between the second base station and the first base station.

Step 202: The first base station determines, according to the semi-persistent scheduling configuration information that is scheduled by the second base station for the UE, a maximum uplink transmit power that is allocated by the UE to the first base station.

That the first base station determines, according to the semi-persistent scheduling configuration information that is scheduled by the second base station for the UE, a maximum uplink transmit power that is allocated by the UE to the first base station is specifically that: the first base station determines an offset of an uplink transmit power according to the semi-persistent scheduling configuration information that is scheduled by the second base station for the UE; and the first base station adds the offset to an initial maximum uplink transmit power that is allocated by the UE to the first base station, and determines that a sum of the offset and the initial maximum uplink transmit power is the maximum uplink transmit power allocated by the UE to the first base station. It is understandable that the offset may also be zero, that is, no offset needs to be added for the first base station. In this case, the initial maximum uplink transmit power that is allocated by the UE to the first base station is the maximum uplink transmit power that is allocated by the UE to the first base station.

When the first base station knows, according to the semi-persistent scheduling configuration information, that the second base station does not schedule uplink data of the UE in a subsequent period of time, for example, when the first base station receives the SPS deactivation instruction or the SPS configuration deletion command, the first base station adds the offset of the uplink power when determining the maximum uplink transmit power of the first base station, that is, uses power compensation, and allocates a part of the transmit power of the second base station to the first base station to increase the maximum uplink transmit power of the first base station. Specifically, the first base station recalculates the maximum transmit power $P'_{TMAX,eNB1}$ allocated by the UE to the first base station. A specific calculation manner is that: the second base station indicates the offset $\Delta_{PTMAX}$ of the uplink transmit power; when the first base station calculates the maximum uplink transmit power $P'_{TMAX,eNB1}$, the first base station adds the offset $\Delta_{PTMAX}$ on a basis of the initial maximum uplink transmit power $P_{TMAX,eNB1}$ that is allocated by the UE to the first base station, namely, $P'_{TMAX,eNB1}=P_{TMAX,eNB1}+\Delta_{PTMAX}$.

When the first base station determines, according to the SPS activation instruction, that the second base station has uplink data to send, the first base station does not use power compensation, that is, when the first base station determines the maximum uplink transmit power, it is unnecessary to add the offset to the initial maximum uplink transmit power.

The following describes in detail how the first base station determines the offset of the uplink transmit power. The first base station determines the offset of the uplink transmit power when identifying, according to the status of the uplink resource that is scheduled by the second base station for the UE, that an uplink resource scheduled by the second base station for the UE at a current time point is lower than a set threshold. A value of the offset may also be preconfigured, or the offset may be dynamically allocated according to the status of the uplink resource of the UE.

It may be known from the foregoing description that the first base station needs to pre-acquire the initial maximum uplink transmit power allocated by the UE to the first base station. In this embodiment, the initial maximum uplink transmit power that is allocated by the UE to the first base station is the initial maximum uplink transmit power determined according to a downlink path loss or an uplink path loss between each base station and the UE, or the initial maximum uplink transmit power may also be determined in other manners, for example, an initial maximum uplink transmit power allocated to each base station is specified according to an actual processing capability of each base station, as long as it is ensured that a sum of the initial maximum uplink transmit power allocated to each base station does not exceed the maximum transmit power of the UE.

Step 203: The first base station acquires a power headroom of the UE that is recalculated according to the maximum uplink transmit power.

This step is an optional step. In this embodiment, only when the maximum uplink transmit power determined by the first base station changes compared with a historical value, or when a variation exceeds a preset threshold, the first base station acquires the power headroom of the UE that is recalculated according to the maximum uplink transmit power. Specifically, when the maximum uplink transmit power allocated to the first base station changes, a maximum transmit power allocated by the UE to each carrier of the first base station also changes. Correspondingly, the power headroom of the UE also changes. The PH refers to a difference between a maximum uplink transmit power $P_{CMAX,c}$ allocated by the UE to each carrier of each base station and an estimated uplink transmit power of the UE for uplink transmission. A power headroom PH of the UE on carrier C is classified into two types as follows.

A formula for calculating the PH of a first type is: $PH = P_{CMAX,c} - P_{PUSCH}$.

$P_{CMAX,c}$ indicates a maximum uplink transmit power that is allocated by the UE to carrier C of the first base station, and $P_{PUSCH}$ indicates a transmit power of a physical uplink shared channel (Physical Uplink Shared Channel, PUSCH for short). In this manner, at the same time, when data is sent on the PUSCH, control information is not sent on a physical uplink control channel PUCCH.

A formula for calculating the PH of a second type is: $PH = P_{CMAX,c} - P_{PUSCH} - P_{PUCCH}$.

$P_{CMAX,c}$ indicates a maximum uplink transmit power that is allocated by the UE to carrier C of the first base station, $P_{PUSCH}$ indicates a transmit power allocated to a physical uplink shared channel PUSCH, and $P_{PUCCH}$ indicates information of a transmit power allocated to the PUCCH. In this manner, at the same time, sending of control information is allowed on the PUCCH when data is sent on the PUSCH.

In this embodiment, because the maximum uplink transmit power $P_{TMAX,eNB1}$ allocated to the first base station changes, the offset $\Delta_{PTMAX}$ is added on a basis of the initial maximum uplink transmit power, and the maximum uplink transmit power of each carrier of the first base station also changes correspondingly. In this embodiment, the first base station has only one carrier, which is used as an example. Therefore, $P'_{CMAX,c} = P_{CMAX,c} + \Delta_{PTMAX}$, that is, the offset $\Delta_{PTMAX}$ of the uplink transmit power is added on a basis of the maximum uplink transmit power of carrier C, and therefore, $PH' = P'_{CMAX,c} - P_{PUSCH} - P_{PUCCH}$, or $PH' = P'_{CMAX,c} - P_{PUSCH}$. Certainly, the first base station may also have multiple carriers, and may properly add a power offset for each carrier, to ensure that a sum of maximum uplink transmit powers of the carriers after the addition does not exceed the maximum uplink transmit power allowed by the UE.

By using the foregoing method, a transmit power of a carrier corresponding to the base station may be adjusted according to an actual situation, so that resources of each carrier can all be used maximally, which improves transmission efficiency of uplink data and a throughput of the UE. It is understandable that the power headroom may also be calculated by the UE and reported to the first base station.

Step 204: The first base station configures an uplink transmit power for the UE according to the maximum uplink transmit power allocated by the UE to the first base station, a maximum uplink transmit power of each carrier, and the power headroom.

The first base station allocates, according to $P'_{TMAX,eNB1}$, $P'_{CMAX,c}$, and PH', the uplink transmit power to the UE for use. Specifically, the first base station compares values of $P'_{TMAX,eNB1}$ and $P'_{CMAX,c}$, and selects a smaller one of the two values to allocate the uplink transmit power to the UE, to ensure that the maximum uplink transmit power allocated to the UE does not exceed the smaller one of the two values.

A main scenario to which this embodiment is applicable is that the second base station is responsible for delivering and receiving voice service data only, while the first base station is responsible for delivering and receiving other services. A reason for the consideration is that in the present invention, the second base station is used as a master base station, and the master base station generally covers a wide range, and can better support continuity of the voice service and improve user experience.

In the method provided by this embodiment, an uplink transmit power is allocated to each base station in a manner of semi-persistent scheduling between base stations; a second base station delivers a semi-persistent scheduling configuration; and when allocating an uplink transmit power to UE, a first base station determines, according to the semi-persistent scheduling configuration, a maximum uplink transmit power allocated by the UE to the first base station itself. The first base station can adjust its uplink transmit power properly, which increases a throughput of the UE and utilization of an uplink resource.

FIG. 3 is a flowchart of Embodiment 3 of a method for controlling an uplink transmit power in inter-base station carrier aggregation. In this embodiment, an initial maximum uplink transmit power is obtained by calculation according to an uplink path loss and a downlink path loss, and a detailed description about how to calculate, according to the uplink path loss and the downlink path loss, an initial maximum uplink transmit power allocated by UE to each base station is provided. The method provided by this embodiment includes the following steps.

Step 301: A first base station acquires an initial maximum uplink transmit power that is allocated by UE to the first base station, where the initial maximum uplink transmit power is determined according to a downlink path loss or an uplink path loss between each base station and the UE.

In this embodiment, the first base station is a secondary base station, and a second base station is a master base station. For the UE, in each access process, there is only one master base station, but there may be multiple secondary base stations. That a first base station acquires an initial maximum uplink transmit power that is allocated by UE to the first base station may be specifically implemented in the following three manners.

In a first implementation manner, the first base station receives the initial maximum uplink transmit power that is allocated by the UE to the first base station and reported by the UE, where the initial maximum uplink transmit power is allocated by the UE from a maximum uplink transmit power of the UE according to a proportion of the downlink path loss between each base station and the UE.

In a second implementation manner, the first base station receives the initial maximum uplink transmit power that is allocated by the UE to the first base station and sent by the second base station, where the initial maximum uplink transmit power is allocated by the second base station from the maximum uplink transmit power of the UE according to the proportion of the downlink path loss between each base station and the UE.

In a third implementation manner, the first base station acquires the uplink path loss between each base station and the UE that is sent by the second base station; the first base station obtains by calculation, from the maximum uplink transmit power of the UE and according to a proportion of the uplink path loss, the initial maximum uplink transmit power that is allocated by the UE to the first base station. The first base station not only needs to acquire the uplink path loss between each base station and the UE that is sent by the second base station, but also needs to calculate an uplink path loss between the first base station and the UE by itself. Specifically, first, the first base station receives a sounding reference signal sent by the UE; then, the first base station determines the uplink path loss between the first base station and the UE according to a receive power and a transmit power of the sounding reference signal; finally, the first base station reports the uplink path loss between the first base station and the UE to the second base station, so that the second base station forwards the uplink path loss to other base stations. In this way, each base station mutually knows the uplink path loss between each base station and the UE, and can allocate a power from the maximum uplink transmit power of the UE according to the proportion of the uplink path loss.

Step 302: The first base station allocates an uplink transmit power to the UE according to the initial maximum uplink transmit power.

In this embodiment, after the first base station acquires the initial maximum uplink transmit power that is allocated by the UE to the first base station, the first base station may further add a supplementary offset to the initial maximum uplink transmit power according to an actual requirement or a configuration of the second base station, where the supplementary offset may be configured by the second base station for the first base station. When a large amount of data needs to be transmitted between the first base station and the UE, but a small amount of data is transmitted between the UE and the second base station, the uplink transmit power of the first base station may be increased, and the maximum uplink transmit power allocated by the UE to the first base station may be increased. Therefore, a throughput of the UE can be increased, utilization of a whole network is increased, and no interference is caused to the second base station.

In this embodiment, the first base station may acquire, according to a set period, or when the uplink path loss or downlink path loss changes, or when a path loss variation exceeds a set threshold, the initial maximum uplink transmit power that is allocated by the UE to the first base station.

In the method provided by this embodiment, when a first base station allocates an uplink transmit power to UE, the first base station determines the uplink transmit power according to an acquired initial maximum uplink transmit power. Because the initial maximum uplink transmit power is determined according to an uplink path loss between each base station and the UE, it can be ensured that an initial maximum uplink transmit power allocated to each base station does not exceed an actual requirement of the UE, and that a proper transmit power can be allocated to each base station according to a path loss between each base station and the UE, which increases a throughput of the UE and utilization of an uplink resource.

Figure 4:
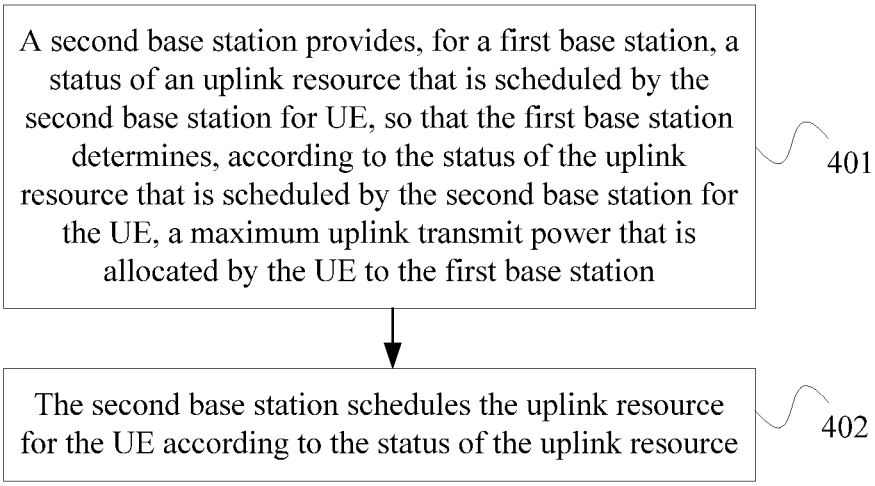
FIG. 4 is a flowchart of Embodiment 4 of a method for controlling an uplink transmit power in inter-base station carrier aggregation according to an embodiment.

FIG. 4 is a flowchart of Embodiment 4 of a method for controlling an uplink transmit power in inter-base station carrier aggregation. The method provided by this embodiment is executed by an apparatus for controlling an uplink transmit power in inter-base station carrier aggregation, where the apparatus is integrated in a base station. The method provided by this embodiment specifically includes the following steps.

Step 401: A second base station provides a status of an uplink resource that is scheduled by the second base station for UE, to a first base station, so that the first base station determines, according to the status of the uplink resource that is scheduled by the second base station for the UE, a maximum uplink transmit power that is allocated by the UE to the first base station.

Specifically, the second base station may provide the status of the uplink resource to the first base station in the following two manners.

In a first manner, the second base station sends the status of the uplink resource that is scheduled by the second base station for the UE, to the first base station, or sends the status of the uplink resource that is scheduled by the second base station for the UE, to the first base station through the UE. That the second base station sends the status of the uplink resource that is scheduled by the second base station for the UE, to the first base station through the UE, is specifically that: the second base station sends the status of the uplink resource that is scheduled by the second base station for the UE, to the UE by using a MAC CE, an RRC message, or uplink control information, so that the UE sends the status of the uplink resource to the first base station.

In the first manner, the second base station may decide, according to an uplink sending status of the UE, not to schedule, in the second base station, uplink data of the UE in a period of time, and may deliver a related indication to the UE, indicating to the UE how long the uplink data of the UE is not scheduled, or indicating that uplink control information of the UE, such as a PUCCH, is not scheduled in a period of time. The second base station determines the status of the uplink resource that is scheduled by the second base station for the UE, and delivers the status of the uplink resource to the first base station or the UE. Specifically, the status of the uplink resource includes an indication that the second base station does not perform uplink data scheduling, a corresponding time, and the like.

In a second manner, when establishing a voice service for the UE, the second base station configures semi-persistent scheduling of the uplink resource for the UE, and sends semi-persistent scheduling configuration information to the first base station, or sends semi-persistent scheduling configuration information to the UE, so that the UE sends the semi-persistent scheduling configuration information to the first base station. The semi-persistent scheduling configuration information includes an SPS configuration command, an SPS configuration deletion command, an SPS activation instruction, and an SPS deactivation instruction.

Step 402: The second base station schedules the uplink resource for the UE according to the status of the uplink resource.

The second base station determines, according to the status of the uplink resource allocated by the second base station to the UE, to schedule the uplink resource for the UE. In a case in which the second base station does not perform data scheduling, the maximum uplink transmit power may be reduced properly, a part of the transmit power is allocated to the first base station, and an uplink transmit power of the first base station is increased. The second base station may configure an offset value of an uplink power for the first base station, and deliver the offset value to the first base station and the UE, so that the first base station can adjust the uplink transmit power.

In the method provided by this embodiment, a second base station sends a status of an uplink resource that is scheduled by the second base station for UE, to a first base station, so that the first base station properly adjusts an uplink transmit power of the first base station according to the status of the uplink resource of the second base station. Therefore, a throughput of the UE is increased, and utilization of the uplink resource is increased.

Figure 5:
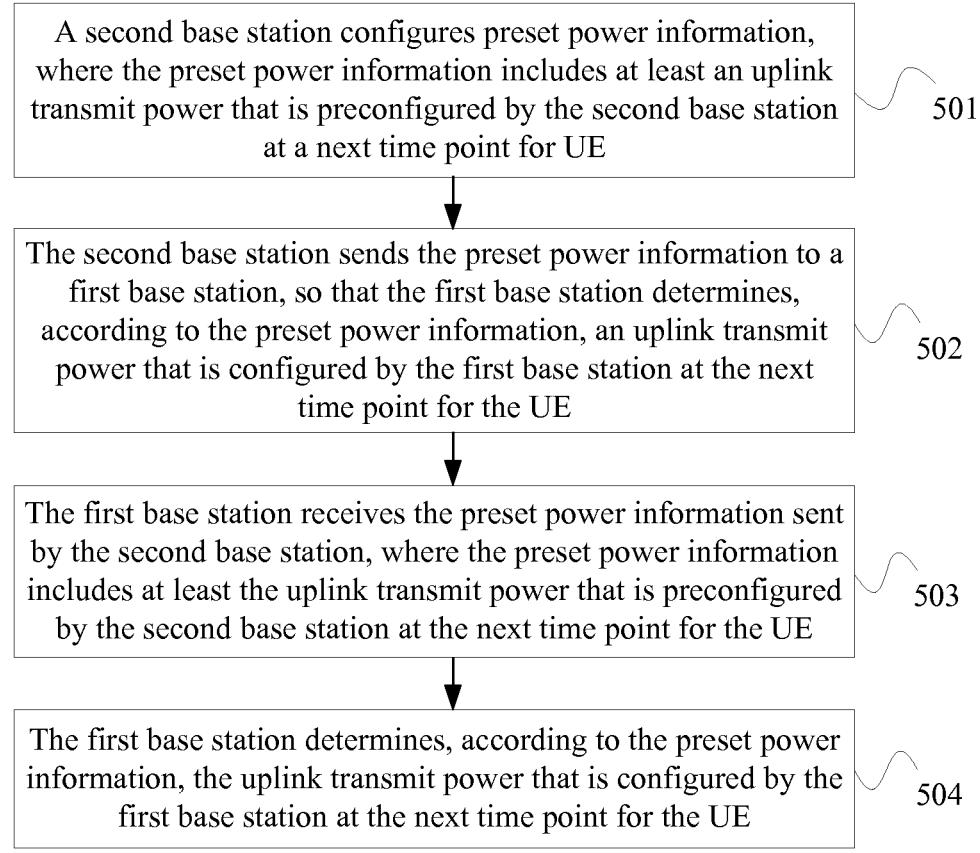
FIG. 5 is a flowchart of Embodiment 5 of a method for controlling an uplink transmit power in inter-base station carrier aggregation according to an embodiment.

FIG. 5 is a flowchart of Embodiment 5 of a method for controlling an uplink transmit power in inter-base station carrier aggregation. In the method provided by this embodiment, an uplink transmit power of UE can be dynamically adjusted. In this embodiment, a first base station is a secondary base station, and a second base station is a master base station. Specifically, the following steps are included.

Step 501: A second base station configures preset power information, where the preset power information includes at least an uplink transmit power that is preconfigured by the second base station at a next time point for UE.

The second base station preconfigures the preset power information according to a status of data that needs to be scheduled actually at the next time point. In this embodiment, the preset power information sent by the second base station to a first base station may include: a maximum transmit power of the UE, a maximum transmit power allocated by the UE to the second base station, an uplink control information scheduling status of the UE, a maximum transmit power allocated by the UE to each carrier of the second base station, and an offset of an uplink transmit power used by the second base station. The preset power information may further include: whether the UE has uplink control information for scheduling, and whether uplink data and uplink control information are scheduled in parallel.

Step 502: The second base station sends the preset power information to a first base station, so that the first base station determines, according to the preset power information, an uplink transmit power that is configured by the first base station at the next time point for the UE.

The second base station may send the preset power information to the first base station at every transmission time interval TTI, so that the first base station can accurately allocate an uplink power to the UE according to the preset power information. When the second base station does not perform data scheduling at the next time point, the preset power information may carry indication information, notifying the first base station that no data is scheduled at the next time point.

In this embodiment, in a case in which the preset power information of the second base station does not change frequently, to reduce a resource for sending the preset power information, the second base station does not need to send the preset power information to the first base station at every TTI, and the preset power information may carry preset power information that is for a period of time.

Step 503: The first base station receives the preset power information sent by the second base station, where the preset power information includes at least the uplink transmit power that is preconfigured by the second base station at the next time point for the UE.

When the first base station allocates the uplink transmit power at the next time point to the UE according to the preset power information sent by the second base station, the transmit power allocated to the first base station may be increased properly.

Step 504: The first base station determines, according to the preset power information, the uplink transmit power that is configured by the first base station at the next time point for the UE.

Specifically, according to the preset power information, if the maximum transmit power allocated by the UE to the second base station is low, the first base station may increase the uplink transmit power allocated at the next time point to the UE, but it must be ensured that a sum of maximum transmit powers allocated to the first base station and the second base station does not exceed the maximum transmit power of the UE. If power compensation is considered for the maximum transmit power allocated by the UE to the second base station, the preset power information further includes the offset of the uplink transmit power used by the second base station. In addition, according to the maximum transmit power allocated by the UE to each carrier of the second base station, a maximum transmit power allocated to each carrier of the first base station and a power headroom are adjusted. For a specific calculation method, reference may be made to the description in Embodiment 2. After receiving the preset power information that is of the second base station and is for the next time point, the first base station adjusts the uplink transmit power configured by the first base station at the next time point for the UE. If the uplink transmit power that is configured by the second base station at the next time point for the UE is low, the first base station may properly increase the transmit power configured by the first base station at the next time point for the UE, to ensure that a resource of the UE can be used properly. If the uplink transmit power that is configured by the second base station at the next time point for the UE is high, the first base station may properly reduce the transmit power configured by the first base station at the next time point for the UE.

In the method provided by this embodiment, a first base station can adjust in real time, according to an uplink transmit power that is preconfigured at a next time point for UE and reported by a second base station, an uplink transmit power allocated by the first base station at the next time point to the UE. Therefore, an uplink transmit power of the UE can be allocated to each base station more accurately and properly, and an uplink rate and a throughput of the UE are increased.

Figure 6:
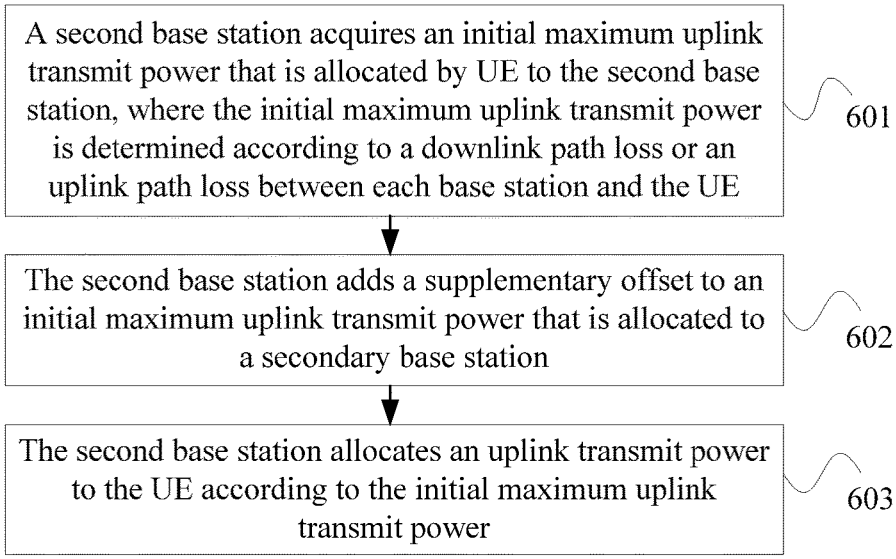
FIG. 6 is a flowchart of Embodiment 6 of a method for controlling an uplink transmit power in inter-base station carrier aggregation according to an embodiment.

FIG. 6 is a flowchart of Embodiment 6 of a method for controlling an uplink transmit power in inter-base station carrier aggregation according. The method provided by this embodiment includes the following steps.

601. A second base station acquires an initial maximum uplink transmit power that is allocated by UE to the second base station, where the initial maximum uplink transmit power is determined according to a downlink path loss or an uplink path loss between each base station and the UE.

The second base station acquires, specifically by using the following methods, the initial maximum uplink transmit power that is allocated by the UE to the second base station.

In a first method, the second base station receives the initial maximum uplink transmit power that is allocated by the UE to the second base station and reported by the UE, where the initial maximum uplink transmit power is allocated by the UE from a maximum uplink transmit power of the UE according to a proportion of the downlink path loss between each base station and the UE.

In a second method, the second base station receives an initial maximum uplink transmit power that is allocated by the UE to each base station and reported by the UE; or the second base station receives the downlink path loss of each base station that is reported by the UE, and obtains by calculation, from a maximum uplink transmit power of the UE and according to a proportion of each downlink path loss, an initial maximum uplink transmit power that is allocated by the UE to each base station; the second base station sends each initial maximum uplink transmit power to a corresponding base station.

In a third method, the second base station acquires the uplink path loss between each base station and the UE that is sent by each base station; the second base station obtains by calculation, from a maximum uplink transmit power of the UE and according to a proportion of each uplink path loss, an initial maximum uplink transmit power that is allocated by the UE to each base station. The second base station sends each initial maximum uplink transmit power to a corresponding base station. The second base station further needs to calculate an uplink path loss between the second base station and the UE specifically by using the following method: The second base station receives a sounding reference signal sent by the UE, and determines the uplink path loss between the second base station and the UE according to a receive power and a transmit power of the sounding reference signal.

602. The second base station adds a supplementary offset to an initial maximum uplink transmit power that is allocated to a secondary base station.

This step is an optional step. The second base station may determine, according to an actual situation, whether it is necessary to add the supplementary offset to the initial maximum uplink transmit power that is allocated to the secondary base station. If a supplementary offset is preconfigured, the second base station adds the supplementary offset to the initial maximum uplink transmit power that is allocated to the first base station. Correspondingly, the second base station reduces a power offset allocated to the second base station, where the reduced amount is equal to the supplementary offset allocated to the secondary base station. If no supplementary offset is preconfigured, it is unnecessary to add the supplementary offset.

603. The second base station allocates an uplink transmit power to the UE according to the initial maximum uplink transmit power.

For this step, if step 602 is executed, the initial maximum uplink transmit power in this step is an initial maximum uplink transmit power obtained after the supplementary offset is added; if step 602 is not executed, the initial maximum uplink transmit power in this step refers to an initial maximum uplink transmit power obtained by calculation according to a path loss.

In this embodiment, the second base station acquires, according to a set period, or when the uplink path loss or downlink path loss changes, or when a path loss variation exceeds a set threshold, the initial maximum uplink transmit power that is allocated by the UE to the second base station.

Figure 7:
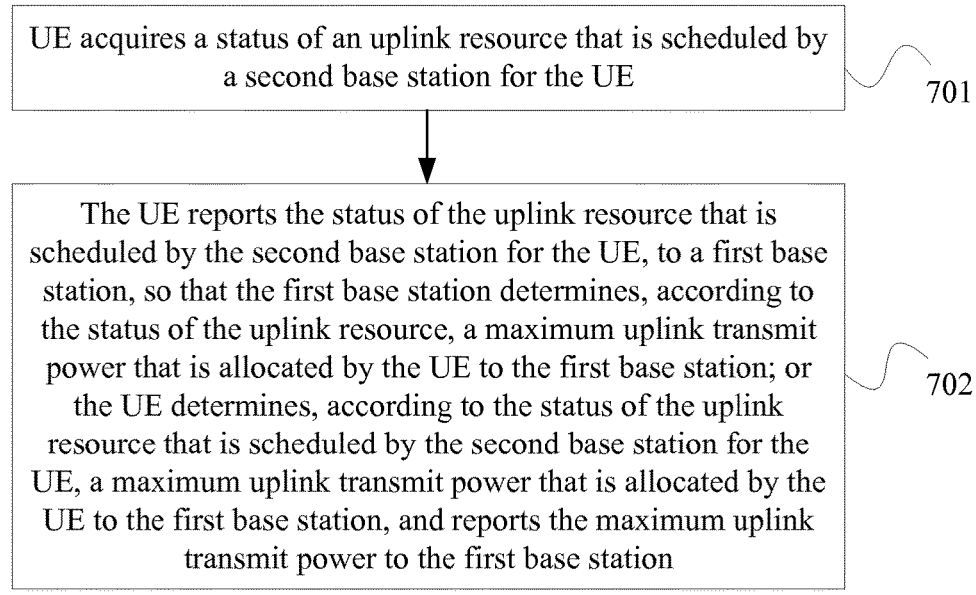
FIG. 7 is a flowchart of Embodiment 7 of a method for controlling an uplink transmit power in inter-base station carrier aggregation according to an embodiment.

FIG. 7 is a flowchart of Embodiment 7 of a method for controlling an uplink transmit power in inter-base station carrier aggregation. The method provided by this embodiment may be executed by an apparatus for controlling an uplink transmit power in inter-base station carrier aggregation, where the apparatus is integrated in UE. The method provided by this embodiment includes the following steps.

Step 701: UE acquires a status of an uplink resource that is scheduled by a second base station for the UE.

Specifically, the UE acquires, in the following manner, the status of the uplink resource that is scheduled by the second base station for the UE. The UE receives the status that is of the uplink resource and is sent by using a MAC CE, an RRC message, or uplink control information by the second base station; or the UE receives an SPS configuration command, an SPS configuration deletion command, an SPS activation instruction, and an SPS deactivation instruction that are sent by the second base station, and uses the commands and instructions as the status of the uplink resource. Or, the UE identifies whether the second base station does not schedule the uplink resource within a set time, and determines the status of the uplink resource according to an identification result.

Step 702: The UE reports the status of the uplink resource that is scheduled by the second base station for the UE, to a first base station, so that the first base station determines, according to the status of the uplink resource, a maximum uplink transmit power that is allocated by the UE to the first base station; or the UE determines, according to the status of the uplink resource that is scheduled by the second base station for the UE, a maximum uplink transmit power that is allocated by the UE to the first base station, and reports the maximum uplink transmit power to the first base station.

In this embodiment, after the UE acquires the status of the uplink resource that is scheduled by the second base station for the UE, the UE may report the status of the uplink resource to the first base station, and the first base station determines the maximum uplink transmit power that is allocated by the UE to the first base station. Certainly, the UE may also determine by itself, according to the status of the uplink resource, the maximum uplink transmit power that is allocated by the UE to the first base station, and report the maximum uplink transmit power to the first base station.

The following describes, by using a specific example, how the UE determines, according to the status of the uplink resource that is scheduled by the second base station, the maximum uplink transmit power that is allocated by the UE to the first base station. First, the UE determines an offset of an uplink transmit power according to the status of the uplink resource that is scheduled by the second base station for the UE. Then, the UE adds the offset to an initial maximum uplink transmit power that is allocated by the UE to the first base station, and determines that a sum of the offset and the initial maximum uplink transmit power is the maximum uplink transmit power allocated by the UE to the first base station, where a value of the offset is preconfigured or is delivered by the second base station by using network signaling.

In this embodiment, the UE acquires, according to a set period, or when an uplink path loss or a downlink path loss changes, or when a path loss variation exceeds a set threshold, an initial maximum uplink transmit power that is allocated by the UE to each base station.

In the method provided by this embodiment, UE acquires a status of an uplink resource that is scheduled by a second base station for the UE, and reports the status of the uplink resource to a first base station, so that the first base station determines, according to the status of the uplink resource that is scheduled by the second base station for the UE, a maximum uplink transmit power; or the UE determines, according to the status of the uplink resource that is scheduled by the second base station for the UE, a maximum uplink transmit power allocated to the first base station, and reports the maximum uplink transmit power to the first base station. Therefore, it is ensured that the maximum uplink transmit power allocated to the first base station is determined according to a resource between base stations, a maximum uplink transmit power can be allocated to each base station properly, and a throughput of the UE and utilization of a network are increased.

In the foregoing step 702, that the UE determines, according to the status of the uplink resource that is scheduled by the second base station for the UE, a maximum uplink transmit power that is allocated by the UE to the first base station, is specifically determining the offset of the uplink transmit power, and adding the offset on a basis of the initial maximum uplink transmit power that is allocated by the UE to the first base station. The UE may determine the initial maximum uplink transmit power by using multiple methods. The UE may determine the initial maximum uplink transmit power according to a downlink path loss or an uplink path loss between each base station and the UE, or may also determine the initial maximum uplink transmit power in other manners, for example, the initial maximum uplink transmit power allocated to each base station is specified according to an actual processing capability of each base station, as long as it is ensured that a sum of the initial maximum uplink transmit power allocated to each base station does not exceed a maximum transmit power of the UE.

The following briefly describes how the UE determines the initial maximum uplink transmit power. In an implementation manner, the UE reports a downlink path loss between the UE and a base station to the base station, so that the base station determines, according to the downlink path loss, an initial maximum uplink transmit power that is allocated by the UE to the base station. That the UE reports a downlink path loss between the UE and a base station to the base station is specifically that the UE first measures a downlink path loss between the UE and each base station, and then reports the downlink path loss between the UE and each base station to the second base station.

In another implementation manner, the UE determines, according to a downlink path loss between the UE and a base station, an initial maximum uplink transmit power that is allocated by the UE to the base station, and reports the initial maximum uplink transmit power to the base station. That the UE determines, according to a downlink path loss between the UE and a base station, an initial maximum uplink transmit power that is allocated by the UE to the base station, and reports the initial maximum uplink transmit power to the base station is specifically that: the UE first measures a downlink path loss between the UE and each base station, obtains by calculation, from the maximum uplink transmit power of the UE and according to a proportion of the downlink path loss between the UE and each base station, an initial maximum uplink transmit power allocated to each base station, and finally reports the determined initial maximum uplink transmit power to each base station, or reports the determined initial maximum uplink transmit power to the second base station, so that the second base station forwards the determined initial maximum uplink transmit power to each base station.

In the foregoing two manners, that the UE measures a downlink path loss between the UE and each base station is specifically that: the UE receives a sounding reference signal sent by each base station, and determines a downlink path loss between the UE and each base station according to a receive power and a transmit power of the sounding reference signal.

In this embodiment, to allocate the initial maximum uplink transmit power to each base station more properly and increase the throughput of the UE, after the UE determines the initial maximum uplink transmit power allocated to each base station, the UE further adds a supplementary offset to the maximum uplink transmit power allocated to the first base station, and correspondingly reduces an initial maximum uplink transmit power allocated to the second base station.

In this embodiment, the UE acquires, according to a set period, or when an uplink path loss or a downlink path loss changes, or when a path loss variation exceeds a set threshold, the initial maximum uplink transmit power that is allocated by the UE to each base station.

Figure 8:
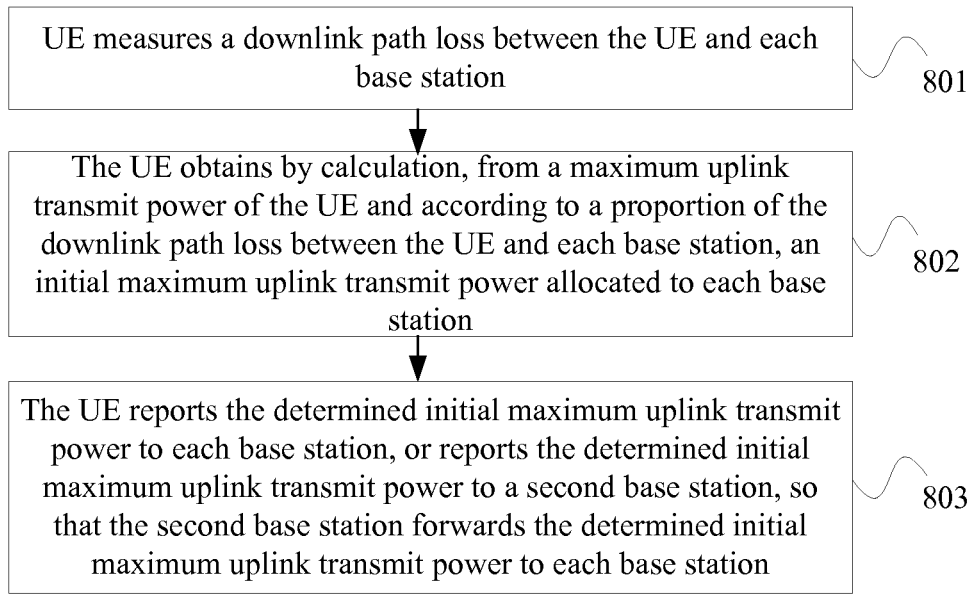
FIG. 8 is a flowchart of Embodiment 8 of a method for controlling an uplink transmit power in inter-base station carrier aggregation according to an embodiment.

FIG. 8 is a flowchart of Embodiment 8 of a method for controlling an uplink transmit power in inter-base station carrier aggregation. This embodiment describes in detail how to determine, according to a downlink pass loss, an initial maximum uplink transmit power allocated to each base station. In this embodiment, a first base station is a secondary base station, and a second base station is a master base station. Specifically, the following steps are included.

Step 801: UE measures a downlink path loss between the UE and each base station.

The UE may measure a downlink receive power of a sounding reference signal, and obtain a downlink path loss by calculating a difference between a transmit power and a receive power of the sounding reference signal (SRS for short), where the sounding reference signal may be a cell reference signal CRS (Cell Reference Signal). Each base station sends a reference signal to the UE, where information sent to the UE carries a transmit power of the reference signal. After receiving the reference signal sent by each base station, the UE measures a receive power of each reference signal, and obtains a downlink path loss between the UE and each base station by subtracting the corresponding receive power from the transmit power of each reference signal.

In the following description, an example in which there are one master base station and one secondary base station for UE is used, where a first base station is the secondary base station, and a second base station is the master base station. It is assumed that a downlink path loss between the UE and the first base station is $PL_{eNB1}$, and that a downlink path loss between the UE and the second base station is $PL_{eNB2}$.

Step 802: The UE obtains by calculation, from a maximum uplink transmit power of the UE and according to a proportion of the downlink path loss between the UE and each base station, an initial maximum uplink transmit power allocated to each base station.

It is assumed that the maximum transmit power of the UE is $P_{TMAX}$, and a proportion of a path loss of the UE served by the first base station is $\alpha = PL_{eNB1}/(PL_{eNB1}+PL_{eNB2})$. Therefore, an initial maximum uplink transmit power that is allocated by the UE to the first base station is $P_{TMAX,eNB1}=\alpha*P_{TMAX}$, and an initial maximum uplink transmit power that is allocated by the UE to the second base station is $P_{TMAX,eNB2}=(1-\alpha)*P_{TMAX}$.

In this embodiment, the initial maximum uplink transmit power may be a value directly obtained by calculation according to the downlink path loss, or may be a modified initial maximum uplink transmit power obtained by adding a supplementary offset to the initial maximum uplink transmit power. Optionally, because the first base station is generally a small-sized base station, a supplementary offset may be added for the UE, so that the UE increases a transmit power in the first base station. By increasing the transmit power in the first base station, a throughput of the UE may be increased, and no interference is caused to the second base station. For example, if the supplementary offset is $\beta=x$ dBm, the initial maximum uplink transmit power allocated to the second base station is $P_{TMAX,eNB2}=\alpha*P_{TMAX}-\beta$, and the initial maximum uplink transmit power allocated to the first base station is $P_{TMAX,eNB1}=(1-\alpha)*P_{TMAX}+\beta$. In addition, the supplementary offset may also be expressed in other forms, for example, in a form of a proportion, 10% of a power of the second base station is used as a supplementary offset and configured for the first base station. The supplementary offset is configured by the second base station for the UE, for example, the supplementary offset is carried in a radio resource control connection reconfiguration message sent to the UE.

Step 803: The UE reports the determined initial maximum uplink transmit power to each base station, or reports the determined initial maximum uplink transmit power to a second base station, so that the second base station forwards the determined initial maximum uplink transmit power to each base station.

The UE reports initial maximum uplink transmit powers that are allocated to the first base station and the second base station and obtained by calculation, to the first base station and the second base station, so that the initial maximum uplink transmit powers are used by the first base station and the second base station for allocating an uplink transmit power. The UE may also report the initial maximum uplink transmit power of each base station to the second base station, and the second base station reports, by using interface information between the second base station and the first base station, the initial maximum uplink transmit power allocated to each base station, to each second base station.

Specifically, the UE may report the initial maximum uplink transmit power to the base station by using a dedicated radio resource control connection message, or may also use a MAC CE for reporting. For example, a new MAC CE may be defined, as shown in Table 1:

TABLE 1

| $C_7$ | $C_6$ | $C_5$ | $C_4$ | $C_3$ | $C_2$ | $C_1$ | R |
|---|---|---|---|---|---|---|---|
| P | V | | | PH (Type2, PCell) | | | |
| R | R | | | $P_{CMAX,c}$ 1 | | | |
| P | V | | | PH (Type1, PCell) | | | |
| R | R | | | $P_{CMAX,c}$ 2 | | | |

TABLE 1-continued

| $C_7$ | $C_6$ | $C_5$ | $C_4$ | $C_3$ | $C_2$ | $C_1$ | R |
|---|---|---|---|---|---|---|---|
| P | V | | | PH (Type1, SCell 1) | | | |
| R | R | | | $P_{CMAX,c}$ 3 | | | |
| | | | | . . . | | | |
| P | V | | | $P_{TMAX\,(eNBn)}$ | | | |
| R | R | | | $P_{TMAX,\,eNBn}$ | | | |

In this embodiment, the UE acquires, according to a set period, or when a downlink path loss changes, or when a path loss variation exceeds a set threshold, the initial maximum uplink transmit power that is allocated by the UE to each base station.

In the method provided by this embodiment, UE calculates a downlink path loss between the UE and each base station, allocates an initial maximum uplink transmit power to each base station from a maximum uplink transmit power of the UE according to a proportion of the downlink path loss, and sends the calculated maximum uplink transmit power that is allocated by the UE to each base station, to each base station, so that each base station allocates an uplink transmit power to the UE and schedules a resource according to the initial maximum uplink transmit power. In the method provided by this embodiment, when allocating a power to each base station, the UE comprehensively considers the downlink path loss of each base station, and can coordinate powers between base stations well, which increases a throughput of the UE and utilization of an uplink resource.

Figure 9:
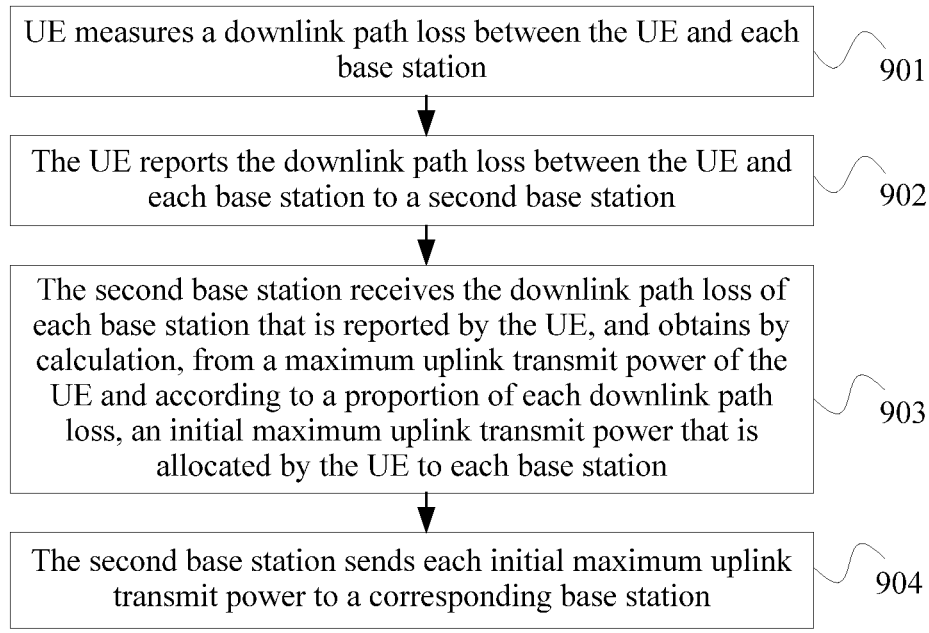
FIG. 9 is a flowchart of Embodiment 9 of a method for controlling an uplink transmit power in inter-base station carrier aggregation according to an embodiment.

FIG. 9 is a flowchart of Embodiment 9 of a method for controlling an uplink transmit power in inter-base station carrier aggregation. As shown in the FIG. 9, the following steps are included.

Step 901: UE measures a downlink path loss between the UE and each base station.

In this embodiment, the UE also receives a reference signal sent by each base station, such as a cell reference signal (CRS), and determines the downlink path loss between the UE and each base station according to a receive power and a transmit power of the reference signal. For a specific calculation method, reference may be made to the implementation manner of Embodiment 8, and no further description is provided herein.

Step 902: The UE reports the downlink path loss between the UE and each base station to a second base station.

In this embodiment, the second base station is a master base station, that is, the UE reports the calculated downlink path loss to the master base station. The UE may use a dedicated radio resource control message, for example, define a new RRC downlink path loss reporting message. After receiving a configuration message of a first base station, the UE triggers measuring and reporting of the downlink path loss between the UE and each base station, or when the second base station configures the first base station for the UE, the second base station triggers a downlink path loss reporting request message to the UE, and the UE measures and reports the downlink path loss according to the request message.

Because the UE moves, the measured downlink path loss changes. When the downlink path loss changes, a changed path loss value should be reported again. The second base station acquires updated path loss information, and recalculates an initial maximum uplink transmit power allocated to each base station. Triggering conditions for the UE may be as follows.

Periodic triggering: A network side delivers a configured period to the UE, and the UE periodically calculates and reports the downlink path loss of each base station according to the configuration of the network side.

Event triggering: For example, the network side configures a threshold of a change of a downlink path loss or maximum transmit power; when the UE detects that a variation of the downlink path loss exceeds the threshold, the UE is triggered to report the downlink path loss of each base station. For another example, the network side configures a threshold of a difference between downlink path losses of base stations; when a change of a difference between path losses of the first base station and the second base station exceeds the threshold, the UE is triggered to report the downlink path loss of each base station. For another example, the network side configures a threshold of a ratio between downlink path losses of base stations; when a change of a ratio between path losses of the first base station and the second base station exceeds the threshold, the UE is triggered to report the downlink path loss of each base station.

The network side may also periodically deliver a downlink path loss request message, and the UE reports the downlink path loss of each base station according to the request of the network side.

Step 903: The second base station receives the downlink path loss of each base station that is reported by the UE, and obtains by calculation, from a maximum uplink transmit power of the UE and according to a proportion of each downlink path loss, an initial maximum uplink transmit power that is allocated by the UE to each base station.

In this embodiment, the second base station further needs to acquire the maximum uplink transmit power of the UE. Specifically, the second base station may determine the maximum transmit power of the UE according to a type of the UE included in capability information of the UE. After the UE initially accesses a network, the UE reports the capability information of the UE to the second base station, where the capability information of the UE includes information such as the type of the UE and a frequency supported by the UE. For different types of UEs, supported transmit capacities and powers are different. Therefore, the maximum uplink transmit power of the UE can be determined according to the type of the UE.

After the maximum uplink transmit power of the UE is determined, the second base station performs allocation from the maximum uplink transmit power of the UE according to the proportion of the downlink path loss between each base station and the UE. For a specific method, reference may be made to the method for calculating the initial maximum uplink transmit power by the UE in Embodiment 8, and no further description is provided herein.

Step 904: The second base station sends each initial maximum uplink transmit power to a corresponding base station.

In this step, the second base station delivers the allocated initial maximum uplink transmit power of each second base station to a corresponding base station. The second base station may deliver the allocated initial maximum uplink transmit power to the first base station by using an interface message between the second base station and the first base station, such as an X2 interface message. The first base station receives the initial maximum uplink transmit power that is allocated by the UE to the first base station and sent by the second base station, and the first base station performs resource allocation and scheduling for the UE according to the initial maximum uplink transmit power allocated by the UE.

In this embodiment, the UE reports the downlink path loss of each base station to the second base station, and the second base station obtains by calculation, from the maximum uplink transmit power of the UE and according to the proportion of each downlink path loss, the initial maximum uplink transmit power that is allocated by the UE to the first base station. It is understandable that the UE may also report the downlink path loss of each base station to the first base station; the first base station receives the downlink path loss of each base station that is reported by the UE, and obtains by calculation, from the maximum uplink transmit power of the UE and according to the proportion of each downlink path loss, the initial maximum uplink transmit power that is allocated by the UE to the first base station. The first base station is a secondary base station. Each secondary base station calculates an initial maximum uplink transmit power allocated to it, and reports its initial maximum uplink transmit power to the master base station.

In the method provided by this embodiment, UE calculates a downlink path loss between the UE and each base station, and reports the downlink path loss to a second base station; the second base station allocates an initial maximum uplink transmit power to each base station according to a proportion of the downlink path loss, and sends the initial maximum uplink transmit power to a corresponding base station. In the method provided by this embodiment, when allocating a power to each base station, the second base station comprehensively considers the downlink path loss of each base station, and coordinates powers between base stations according to an actual capability of each base station, which increases a throughput of the UE and utilization of an uplink resource.

Figure 10:
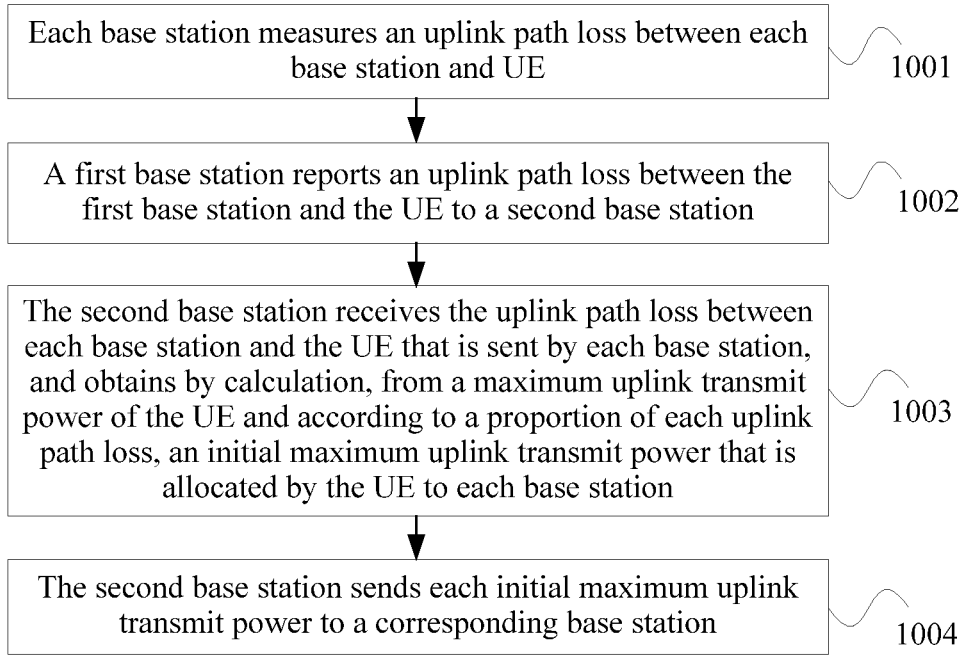
FIG. 10 is a flowchart of Embodiment 10 of a method for controlling an uplink transmit power in inter-base station carrier aggregation according to an embodiment.

FIG. 10 is a flowchart of Embodiment 10 of a method for controlling an uplink transmit power in inter-base station carrier aggregation. The following steps are included.

Step 1001: Each base station measures an uplink path loss between each base station and UE.

Each base station measures a receive power of an uplink reference signal sent by the UE, such as a sounding reference signal, where a difference between the receive power and a transmit power of the uplink reference signal is an uplink path loss. Specifically, a first base station receives a sounding reference signal sent by the UE, and the first base station determines an uplink path loss between the first base station and the UE according to a receive power and a transmit power of the sounding reference signal. A second base station uses the same method to calculate an uplink path loss.

Step 1002: A first base station reports an uplink path loss between the first base station and the UE to a second base station.

In this embodiment, each base station calculates an uplink path loss between each base station and the UE by itself, and the first base station reports the uplink path loss between the first base station and the UE to the second base station, so that the second base station determines an initial maximum uplink transmit power according to the uplink path loss between each base station and the UE. The first base station may report the uplink path loss by using an X2 interface message between the first base station and the second base station, where the interface message may be a newly defined dedicated message. The first base station may report the uplink path loss when requested by the second base station or after the uplink path loss changes, or periodically report the uplink path loss according to a configuration of a network side.

Step 1003: The second base station receives the uplink path loss between each base station and the UE that is sent by each base station, and obtains by calculation, from a maximum uplink transmit power of the UE and according to a proportion of each uplink path loss, an initial maximum uplink transmit power that is allocated by the UE to each base station.

The following describes, by using a specific example, how the second base station calculates, according to the proportion of each uplink path loss, the initial maximum uplink transmit power allocated to each base station. In this embodiment, an example in which there are only one master base station and one secondary base station for the UE is used. It is assumed that: a maximum transmit power of the UE is $P_{TMAX}$, the uplink path loss between the UE and the first base station is $PL_{eNB1}$, the uplink path loss between the UE and an SeNB is $P_{TMAX,eNB2}$, an initial maximum uplink transmit power of the UE served by the SeNB is $P_{TMAX,eNB2}$, and an initial maximum uplink transmit power of the UE served by a PeNB is $P_{TMAX,eNB1}$. The PeNB may calculate, according to a proportion value of each uplink path loss, the initial maximum uplink transmit power allocated to each base station, where α is a proportion of the uplink path loss, and $\alpha = PL_{eNB}/(PL_{eNB1}+PL_{eNB2})$. Therefore, a maximum transmit power of the UE served by the PeNB is $P_{TMAX,eNB1}=\alpha*P_{TMAX}$, and a maximum transmit power of the UE served by the secondary eNB is $P_{TMAX,eNB2}=(1-\alpha)*P_{TMAX}$.

In this embodiment, the second base station also needs to pre-acquire the maximum uplink transmit power of the UE. For a specific manner, reference may be made to the description in Embodiment 9.

Optionally, in this step, after the second base station determines the initial maximum uplink transmit power of each base station according to the uplink path loss, the second base station may configure a supplementary offset for the first base station, so that the UE increases a transmit power in the first base station. By increasing the transmit power in the first base station, a throughput of the UE is increased, and no interference is caused to the second base station. For example, if the supplementary offset is β=x dBm, the initial maximum uplink transmit power of the second base station is $P_{TMAX,eNB2}=\alpha*P_{TMAX}-\beta$, and the initial maximum uplink transmit power of the first base station is $P_{TMAX,eNB1}=(1-\alpha)*P_{TMAX}+\beta$. In addition, the supplementary offset may also be expressed in other forms, for example, in a form of a proportion, which is not limited in this embodiment.

Step 1004: The second base station sends each initial maximum uplink transmit power to a corresponding base station.

The second base station sends each initial maximum uplink transmit power to the corresponding base station by using an interface between the second base station and the first base station, so that the first base station adjusts an uplink transmit power of the first base station according to the initial maximum uplink transmit power.

In the method provided by this embodiment, each base station calculates an uplink path loss between each base station and UE, and a first base station reports the uplink path loss to a second base station; the second base station allocates an initial maximum uplink transmit power to each base station according to a proportion of the uplink path loss, and sends the initial maximum uplink transmit power to each base station. In the method provided by this embodiment, when allocating a power to each base station, the second base station comprehensively considers a downlink path loss of each base station, and coordinates powers between base stations according to an actual capability of each base station, which increases a throughput of the UE and utilization of an uplink resource.

Figure 11:
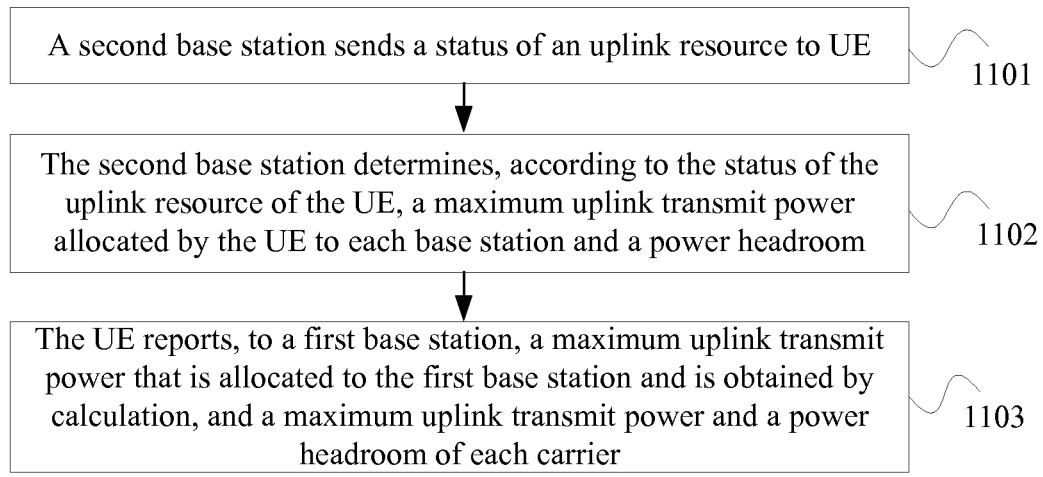
FIG. 11 is a flowchart of Embodiment 11 of a method for controlling an uplink transmit power in inter-base station carrier aggregation according to an embodiment.

FIG. 11 is a flowchart of Embodiment 11 of a method for controlling an uplink transmit power in inter-base station carrier aggregation. Specifically, the following steps are included. In the method provided by this embodiment, UE determines an uplink transmit power according to whether a master base station performs uplink data scheduling. Specifically, the following steps are included:

Step 1101: A second base station sends a status of an uplink resource to UE.

In this embodiment, the second base station may decide, according to an uplink sending status of the UE, not to schedule uplink data of the UE in the second base station in a period of time, and may deliver a related indication to the UE, indicating to the UE how long the uplink data of the UE is not scheduled, or indicating that uplink control information of the UE, such as a PUCCH, is not scheduled in a period of time. Therefore, the second base station determines the status of the uplink resource that is scheduled by the second base station for the UE, and delivers the status of the uplink resource to a first base station or the UE. Specifically, the status of the uplink resource includes an indication that the second base station does not perform uplink data scheduling, a corresponding time, and the like.

Specifically, the second base station sends the status of the uplink resource by using a MAC CE, an RRC message, or uplink control information.

Step 1102: The second base station determines, according to the status of the uplink resource of the UE, a maximum uplink transmit power allocated by the UE to each base station and a power headroom.

Specifically, the UE determines an offset of an uplink transmit power according to the status of the uplink resource that is scheduled by the second base station for the UE; when the second base station does perform data scheduling in a period of time, the UE adds the offset to an initial maximum uplink transmit power that is allocated by the UE to the first base station, and determines that a sum of the offset and the initial maximum uplink transmit power is a maximum uplink transmit power allocated by the UE to the first base station. For example, if the offset of the uplink transmit power that is determined by the UE is $\Delta_{PTMAX}$, and the initial maximum uplink transmit power that is allocated by the UE to the first base station is $P_{TMAX,eNB1}$, the maximum uplink transmit power $P'_{TMAX,eNB1}$ that is allocated by the UE to the first base station is $P'_{TMAX,eNB1}=P_{TMAX,eNB1}+\Delta_{PTMAX}$. In this embodiment, the power headroom may be configured by a network side for the UE, or may also be carried in the status that is of the uplink resource and is sent by the second base station to the UE.

After the maximum uplink transmit power that is allocated by the UE to the first base station changes, a maximum uplink transmit power that is allocated by the UE to each carrier of the first base station also changes. It is assumed that: a maximum uplink transmit power that is allocated by the UE at a previous time point to each carrier of the first base station is $P_{CMAX,c}$, and a recalculated maximum uplink transmit power $P'_{CMAX,c}$ that is allocated by the UE to a carrier of the first base station is $P'_{CMAX,c}=P_{CMAX,c}+\Delta_{PTMAX}$, where $\Delta_{PTMAX}$ is an offset of an uplink transmit power. A power headroom of the first base station is $PH'=P'_{CMAX,c}-P_{PUSCH}-P_{PUCCH}$, or $PH'=P'_{CMAX,c}-P_{PUSCH}$.

Step 1103: The UE reports, to a first base station, a maximum uplink transmit power that is allocated to the first base station and is obtained by calculation, and a maximum uplink transmit power and a power headroom of each carrier.

The UE reports the updated $P'_{TMAX,eNB1}$ that is allocated to the first base station, $P'_{CMAX,c}$, and PH' together to the first base station, so that the first base station uses them to schedule and allocate an uplink power of the UE.

In the method provided by this embodiment, UE calculates a downlink path loss between the UE and each base station, and reports the downlink path loss to a second base station; the second base station allocates an initial maximum uplink transmit power to each base station according to a proportion of the downlink path loss, and sends the initial maximum uplink transmit power to a corresponding base station. In the method provided by this embodiment, when allocating a power to each base station, the second base station comprehensively considers the downlink path loss of each base station, and coordinates powers between base stations according to an actual capability of each base station, which increases a throughput of the UE and utilization of an uplink resource.

Figure 12:
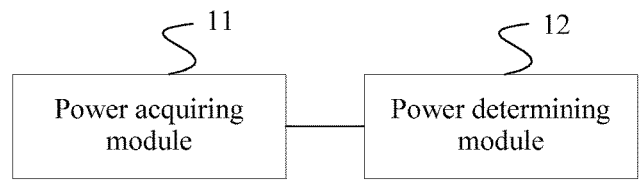
FIG. 12 is a schematic structural diagram of Embodiment 1 of a first base station.

FIG. 12 is a schematic structural diagram of Embodiment 1 of a first base station. As shown in FIG. 12, the first base station provided by this embodiment includes a power acquiring module 11 and a power determining module 12.

The power acquiring module 11 is configured to acquire a maximum uplink transmit power that is allocated by user equipment UE to the first base station, where the maximum uplink transmit power is determined according to a status of an uplink resource that is scheduled by a second base station for the UE.

The first base station receives, from the second base station or the UE, the status of the uplink resource that is scheduled by the second base station for the UE, and the first base station determines, according to the status of the uplink resource that is scheduled by the second base station for the UE, the maximum uplink transmit power that is allocated by the UE to the first base station. Alternatively, the first base station receives, from the second base station or the UE, the maximum uplink transmit power that is allocated by the UE to the first base station, where the maximum uplink transmit power is determined by the second base station or the UE according to the status of the uplink resource that is scheduled by the second base station for the UE.

The status of the uplink resource may be semi-persistent scheduling configuration information of the uplink resource that is scheduled for the UE when the second base station establishes a voice service for the UE. The semi-persistent scheduling configuration information may include an SPS configuration command, an SPS configuration deletion command, an SPS activation instruction, and an SPS deactivation instruction. Status information of the uplink resource may also be the status that is of the uplink resource and is sent by the second base station by using a MAC CE, an RRC message, or uplink control information.

The power determining module 12 is configured to configure an uplink transmit power for the UE according to the maximum uplink transmit power.

After the power acquiring module 11 acquires the maximum uplink transmit power allocated by the UE, the power determining module 12 configures the uplink transmit power for the UE properly according to the maximum uplink transmit power allocated by the UE, and controls the uplink transmit power allocated to the UE not to exceed a maximum uplink transmit power of the UE, or properly reduces a transmit power of the UE.

The first base station provided by this embodiment may be configured to execute the technical solution provided by method Embodiment 1. The specific implementation manner and technical effect are similar, and are not further described herein.

When the first base station provided by this embodiment allocates a transmit power to UE, the first base station performs allocation according to a maximum transmit power that is allocated by the UE to the first base station. Because the maximum transmit power allocated to the first base station is allocated according to status information of an uplink resource of a second base station, a power that is allocated by the UE to each base station can be coordinated. Therefore, the first base station can accurately allocate an uplink transmit power to the UE, and a throughput of the UE is increased while requirements of multiple base stations for transmit powers are satisfied.

Figure 13:
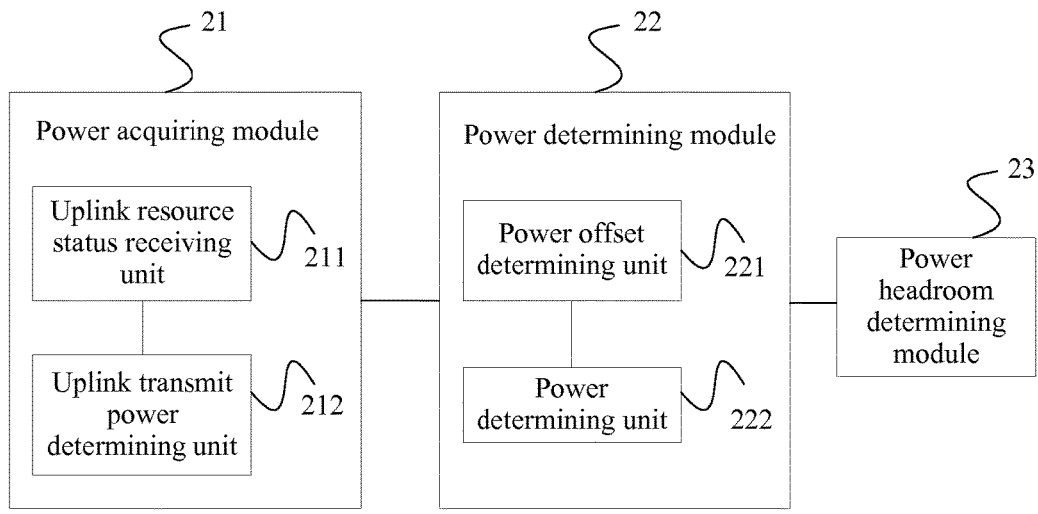
FIG. 13 is a schematic structural diagram of Embodiment 2 of a first base station.

FIG. 13 is a schematic structural diagram of Embodiment 2 of a first base station. In this embodiment, a first base station is a secondary base station, and a second base station is a master base station. As shown in FIG. 13, the first base station provided by this embodiment includes: a power acquiring module 21, configured to acquire a maximum uplink transmit power that is allocated by user equipment UE to the first base station, where the maximum uplink transmit power is determined according to a status of an uplink resource that is scheduled by a second base station for the UE; and a power determining module 22, configured to configure an uplink transmit power for the UE according to the maximum uplink transmit power.

In this embodiment, the power acquiring module 21 includes an uplink resource status receiving unit 211 and an uplink transmit power determining unit 212.

The uplink resource status receiving unit 211 is configured to receive, from the second base station or the UE, the status of the uplink resource that is scheduled by the second base station for the UE. The status of the uplink resource is semi-persistent scheduling configuration information of the uplink resource that is scheduled for the UE when the second base station establishes a voice service for the UE. The semi-persistent scheduling configuration information includes an SPS configuration command, an SPS configuration deletion command, an SPS activation instruction, and an SPS deactivation instruction.

The uplink transmit power determining unit 212 is configured to determine, according to the status that is of the uplink resource scheduled by the second base station for the UE and is received by the uplink resource status receiving unit 211, the maximum uplink transmit power that is allocated by the UE to the first base station.

In this embodiment, the power determining module 22 includes a power offset determining unit 221 and a power determining unit 222. The power offset determining unit 221 is configured to determine an offset of an uplink transmit power according to the status of the uplink resource that is scheduled by the second base station for the UE. The power offset determining unit 221 is specifically configured to: determine the offset of the uplink transmit power when identifying, according to the status of the uplink resource that is scheduled by the second base station for the UE, that an uplink resource scheduled by the second base station for the UE at a current time point is lower than a set threshold, where a value of the offset is preconfigured. The power determining unit 222 is configured to add the offset to an initial maximum uplink transmit power that is allocated by the UE to the first base station, and determine that a sum of the offset and the initial maximum uplink transmit power is the maximum uplink transmit power allocated by the UE to the first base station. According to the status of the uplink resource of the second base station, when the second base station does not send data or sends a small amount of data, a part or all of a transmit power (namely, a power offset) of the second base station may be allocated to the first base station, to increase a transmit power of the first base station.

The first base station provided by this embodiment further includes a power headroom determining module 23, configured to: when the uplink transmit power determined by the power determining module 22 changes compared with a historical value, or when a variation exceeds a preset threshold, acquire a power headroom of the UE that is recalculated according to the maximum uplink transmit power.

In a feasible implementation manner, the first base station provided by this embodiment further includes a preset power receiving module and a preset power configuring module.

The preset power receiving module is configured to receive preset power information sent by the second base station, where the preset power information includes at least an uplink transmit power that is preconfigured by the second base station at a next time point for the UE, where the preset power information includes: a maximum transmit power of the UE, a maximum transmit power allocated by the UE to the second base station, an uplink control information scheduling status of the UE, a maximum transmit power allocated by the UE to each carrier of the second base station, and an offset of an uplink transmit power used by the second base station.

The preset power configuring module is configured to determine, according to the preset power information, an uplink transmit power that is configured by the first base station at the next time point for the UE. Specifically, when the preset power configuring module allocates the uplink transmit power at the next time point to the UE according to the preset power information that is sent by the second base station and received by the preset power receiving module and an uplink transmit power that is allocated at a previous time point to the first base station and determined by the power determining module 22, the preset power configuring module may properly increase or decrease the transmit power allocated to the first base station. By using this method, the uplink transmit power that is allocated by the first base station at the next time point to the UE may be adjusted in real time; therefore, the UE can allocate an uplink transmit power to each base station more accurately and properly, and an uplink rate and a throughput of the UE are increased.

The technical solution provided by this embodiment may be configured to execute the technical solutions provided by method Embodiment 1, Embodiment 2, Embodiment 5, and Embodiment 11. The specific implementation manner and technical effect are similar, and are not further described herein.

Figure 14:
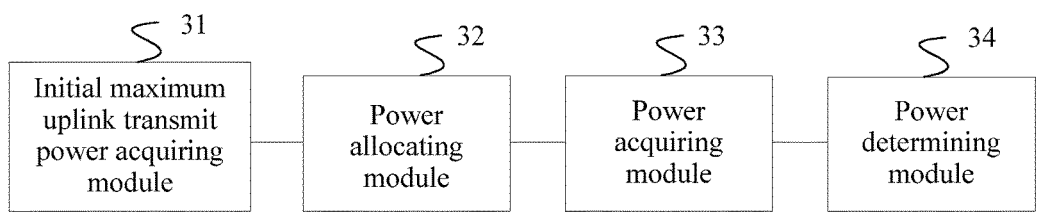
FIG. 14 is a schematic structural diagram of Embodiment 3 of a first base station.

FIG. 14 is a schematic structural diagram of Embodiment 3 of a first base station. In this embodiment, a first base station is a secondary base station, and a second base station is a master base station. As shown in FIG. 14, on a basis of the base station shown in FIG. 12 and FIG. 13, the first base station provided by this embodiment specifically includes an initial maximum uplink transmit power acquiring module 31 and a power allocating module 32.

The initial maximum uplink transmit power acquiring module 31 is configured to acquire an initial maximum uplink transmit power that is allocated by UE to the first base station, where the initial maximum uplink transmit power is determined according to a downlink path loss or an uplink path loss between each base station and the UE.

The power allocating module 32 is configured to allocate an uplink transmit power to the UE according to the initial maximum uplink transmit power.

The initial maximum uplink transmit power acquiring module 31 may acquire, in the following manner, the initial maximum uplink transmit power that is allocated by the UE to the first base station.

Specifically, the initial maximum uplink transmit power acquiring module 31 is configured to: receive the initial maximum uplink transmit power that is allocated by the UE to the first base station and reported by the UE, where the initial maximum uplink transmit power is allocated by the UE from a maximum uplink transmit power of the UE according to a proportion of the downlink path loss between each base station and the UE.

The initial maximum uplink transmit power acquiring module 31 is further configured to: receive the initial maximum uplink transmit power that is allocated by the UE to the first base station and sent by the second base station, where the initial maximum uplink transmit power is allocated by the second base station from the maximum uplink transmit power of the UE according to the proportion of the downlink path loss between each base station and the UE.

The initial maximum uplink transmit power acquiring module 31 is specifically configured to: receive the downlink path loss of each base station that is reported by the UE, and obtain by calculation, from the maximum uplink transmit power of the UE and according to the proportion of each downlink path loss, the initial maximum uplink transmit power that is allocated by the UE to the first base station.

The initial maximum uplink transmit power acquiring module 31 is specifically configured to: acquire the uplink path loss between each base station and the UE that is sent by the second base station, and obtain by calculation, from the maximum uplink transmit power of the UE and according to a proportion of each uplink path loss, the initial maximum uplink transmit power that is allocated by the UE to the first base station.

The initial maximum uplink transmit power acquiring module 31 is further configured to: add a supplementary offset to the initial maximum uplink transmit power after acquiring the initial maximum uplink transmit power that is allocated by the UE to the first base station. The supplementary offset may be configured by the second base station for the first base station. When a large amount of data needs to be transmitted between the first base station and the UE, but a small amount of data is transmitted between the UE and the second base station, the uplink transmit power of the first base station may be increased, and the maximum uplink transmit power allocated by the UE to the first base station may be increased. Therefore, a throughput of the UE can be increased, utilization of a whole network is increased, and no interference is caused to the second base station.

In this embodiment, the initial maximum uplink transmit power acquiring module 31 is specifically configured to: acquire, when the UE initially accesses the first base station, or according to a set period, or when the uplink path loss or downlink path loss changes, or when a path loss variation exceeds a set threshold, the initial maximum uplink transmit power that is allocated by the UE to the first base station. After the initial maximum uplink transmit power that is allocated by the UE to the first base station is acquired, the power allocating module 32 allocates the uplink transmit power to the UE according to the initial maximum uplink transmit power. Then, a power acquiring module 33 is configured to acquire the maximum uplink transmit power that is allocated by the UE to the first base station, where the maximum uplink transmit power that is allocated by the UE to the first base station is determined according to a maximum uplink transmit power that is allocated by the power allocating module 32 to the first base station and a status of an uplink resource that is scheduled by the second base station for the UE; and a power determining module 34 is configured to configure the uplink transmit power for the UE according to the maximum uplink transmit power.

The first base station provided by this embodiment may further include a reference signal receiving module, an uplink path loss determining module, and a path loss reporting module. The reference signal receiving module is configured to receive a sounding reference signal sent by the UE. The uplink path loss determining module is configured to determine an uplink path loss between the first base station and the UE according to a receive power and a transmit power of the sounding reference signal. The path loss reporting module is configured to report the uplink path loss between the first base station and the UE to the second base station, so that the second base station forwards the uplink path loss to other base stations. Therefore, the first base station and the other base stations can determine, according to the uplink path loss between the first base station and the UE, the initial maximum uplink transmit power allocated to the first base station.

The first base station provided by this embodiment is configured to execute the flowchart of method Embodiment 3. The specific implementation manner and technical effect are similar, and therefore are not further described herein.

Figure 15:
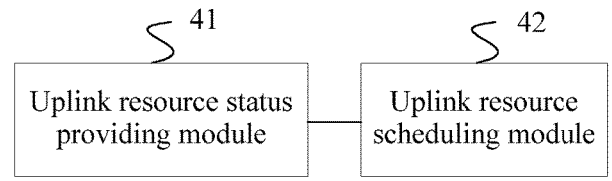
FIG. 15 is a schematic structural diagram of Embodiment 4 of a second base station.

FIG. 15 is a schematic structural diagram of Embodiment 4 of a second base station according to the present invention. As shown in FIG. 15, the second base station provided by this embodiment includes an uplink resource status providing module 41 and an uplink resource scheduling module 42.

The uplink resource status providing module 41 is configured to provide, for a first base station, a status of an uplink resource that is scheduled by the second base station for UE, so that the first base station determines, according to the status of the uplink resource that is scheduled by the second base station for the UE, a maximum uplink transmit power that is allocated by the UE to the first base station.

The uplink resource status providing module 41 provides the status of the uplink resource for the first base station specifically in the following manner.

The uplink resource status providing module 41 sends the status of the uplink resource that is scheduled by the second base station for the UE, to the first base station, or sends the status of the uplink resource that is scheduled by the second base station for the UE, to the first base station through the UE. The uplink resource status providing module 41 may further send the status of the uplink resource that is scheduled by the second base station for the UE, to the UE by using a MAC CE, an RRC message, or uplink control information, so that the UE sends the status of the uplink resource to the first base station.

The uplink resource status providing module 41 is specifically configured to: when establishing a voice service for the UE, configure semi-persistent scheduling of the uplink resource for the UE, and send semi-persistent scheduling configuration information to the first base station, or send semi-persistent scheduling configuration information to the UE, so that the UE sends the semi-persistent scheduling configuration information to the first base station. The semi-persistent scheduling configuration information includes an SPS configuration command, an SPS configuration deletion command, an SPS activation instruction, and an SPS deactivation instruction.

The uplink resource scheduling module 42 is configured to schedule the uplink resource for the UE according to the status of the uplink resource.

In a possible implementation manner, in this embodiment, the first base station is a secondary base station, and the second base station is a master base station. On a basis of the foregoing embodiment, this embodiment further includes a preset power configuring module and a preset power information sending module.

The preset power configuring module is configured to configure preset power information, where the preset power information includes at least an uplink transmit power that is preconfigured by the second base station at a next time point for the UE. The preset power information includes: a maximum transmit power of the UE, a maximum transmit power allocated by the UE to the second base station, an uplink control information scheduling status of the UE, a maximum transmit power allocated by the UE to each carrier of the second base station, and an offset of an uplink transmit power used by the second base station.

The preset power information sending module is configured to send the preset power information to the first base station, so that the first base station determines, according to the preset power information, an uplink transmit power that is configured by the first base station at the next time point for the UE.

The second base station provided by this embodiment may be configured to execute the solutions provided by method Embodiment 4 and Embodiment 5. The specific implementation manner and technical effect are similar, and are not further described herein.

Figure 16:
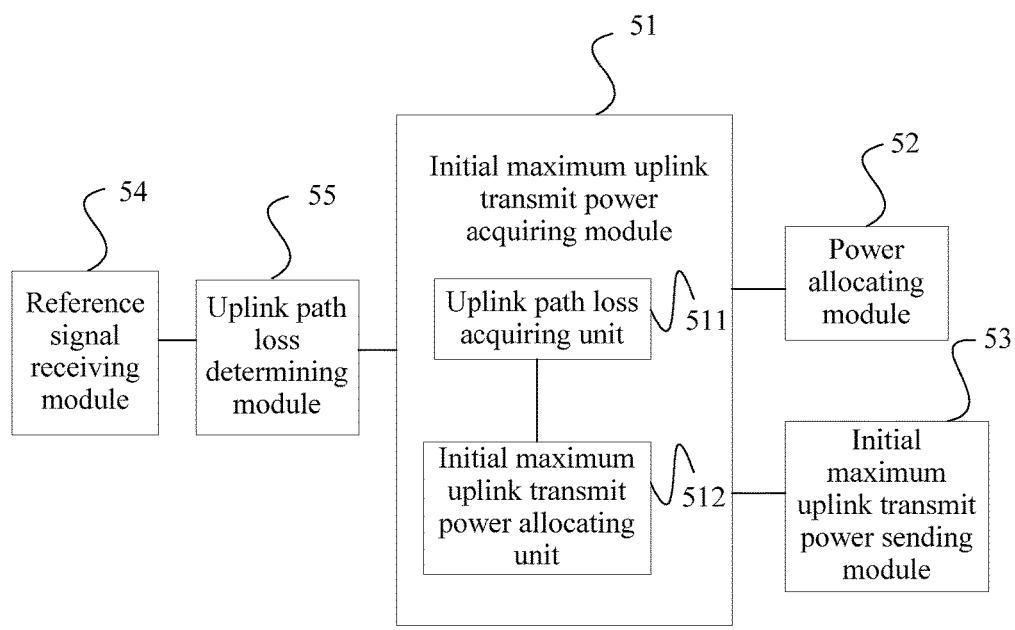
FIG. 16 is a schematic structural diagram of Embodiment 5 of a second base station.

FIG. 16 is a schematic structural diagram of Embodiment 5 of a second base station. As shown in FIG. 16, the second base station provided by this embodiment includes an initial maximum uplink transmit power acquiring module 51, configured to acquire an initial maximum uplink transmit power that is allocated by UE to the second base station, where the initial maximum uplink transmit power is determined according to a downlink path loss or an uplink path loss between each base station and the UE; and a power allocating module 52, configured to allocate an uplink transmit power to the UE according to the initial maximum uplink transmit power.

Specifically, the initial maximum uplink transmit power acquiring module 51 acquires, in the following manners, the initial maximum uplink transmit power allocated to the second base station.

In a first implementation manner, the initial maximum uplink transmit power acquiring module 51 receives the initial maximum uplink transmit power that is allocated by the UE to the second base station and reported by the UE, where the initial maximum uplink transmit power is allocated by the UE from a maximum uplink transmit power of the UE according to a proportion of the downlink path loss between each base station and the UE. In this implementation manner, the initial maximum uplink transmit power is calculated by the UE and reported to the second base station.

In a second implementation manner, the initial maximum uplink transmit power acquiring module 51 receives an initial maximum uplink transmit power that is allocated by the UE to each base station and reported by the UE; or receives the downlink path loss of each base station that is reported by the UE, and obtains by calculation, from the maximum uplink transmit power of the UE and according to the proportion of each downlink path loss, the initial maximum uplink transmit power that is allocated by the UE to each base station. In this implementation manner, the initial maximum uplink transmit power is obtained by the second base station by calculation according to the downlink path loss reported by the UE.

The second base station in this embodiment further includes an initial maximum uplink transmit power sending module 53, configured to send each initial maximum uplink transmit power to a corresponding base station.

When the initial maximum uplink transmit power that is allocated by the UE to each base station is calculated by the second base station, the initial maximum uplink transmit power acquiring module 51 further includes an uplink path loss acquiring unit 511 and an initial maximum uplink transmit power allocating unit 512.

The uplink path loss acquiring unit 511 is configured to acquire the uplink path loss between each base station and the UE that is sent by each base station. In this embodiment, after the second base station obtains the uplink path loss between each base station and the UE that is sent by each base station, the second base station further needs to calculate an uplink path loss between the second base station and the UE. Then, the initial maximum uplink transmit power allocating unit 512 obtains by calculation, from the maximum uplink transmit power of the UE and according to a proportion of each uplink path loss, the initial maximum uplink transmit power that is allocated by the UE to each base station. Finally, the initial maximum uplink transmit power sending module 53 sends each initial maximum uplink transmit power to a corresponding base station. Therefore, the base station provided by this embodiment further includes a reference signal receiving module 54 and an uplink path loss determining module 55.

The reference signal receiving module 54 is configured to receive a sounding reference signal sent by the UE. The uplink path loss determining module 55 is configured to determine the uplink path loss between the second base station and the UE according to a receive power and a transmit power of the sounding reference signal, and provide the determined uplink path loss for the initial maximum uplink transmit power acquiring module 51.

The initial maximum uplink transmit power acquiring module 51 is further configured to: add a supplementary offset to an initial maximum uplink transmit power that is allocated to the secondary base station after obtaining the initial maximum uplink transmit power that is allocated by the UE to each base station. The initial maximum uplink transmit power acquiring module acquires, according to a set period, or when the uplink path loss or downlink path loss changes, or when a path loss variation exceeds a set threshold, the initial maximum uplink transmit power that is allocated by the UE to the second base station.

The second base station provided by this embodiment may be configured to execute the technical solutions of method Embodiment 4 to Embodiment 6 and Embodiment 9 to Embodiment 11. The specific implementation manner and technical effect are similar, and are not further described herein.

Figure 17:
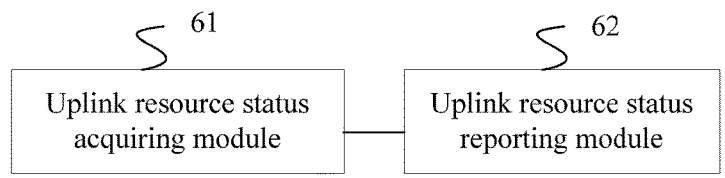
FIG. 17 is a schematic structural diagram of Embodiment 6 of user equipment UE.

FIG. 17 is a schematic structural diagram of Embodiment 6 of user equipment UE according to the present invention. As shown in FIG. 17, the UE provided by this embodiment includes an uplink resource status acquiring module 61 and an uplink resource status reporting module 62.

The uplink resource status acquiring module 61 is configured to acquire a status of an uplink resource that is scheduled by a second base station for the UE.

The uplink resource status acquiring module 61 is specifically configured to: receive the status that is of the uplink resource and is sent by using a MAC CE, an RRC message, or uplink control information by the second base station; or receive an SPS configuration command, an SPS configuration deletion command, an SPS activation instruction, and an SPS deactivation instruction that are sent by the second base station, and use the commands and instructions as the status of the uplink resource; or identify whether the second base station does not schedule the uplink resource within a set time, and determine the status of the uplink resource according to an identification result.

The uplink resource status reporting module 62 is configured to report the status of the uplink resource that is scheduled by the second base station for the UE, to a first base station, so that the first base station determines, according to the status of the uplink resource, a maximum uplink transmit power that is allocated by the UE to the first base station; or determine, according to the status of the uplink resource that is scheduled by the second base station for the UE, a maximum uplink transmit power that is allocated by the UE to the first base station, and report the maximum uplink transmit power to the first base station.

The UE provided by this embodiment acquires a status of an uplink resource that is scheduled by a second base station for the UE, and reports the status of the uplink resource to a first base station, so that the first base station determines, according to the status of the uplink resource that is scheduled by the second base station for the UE, a maximum uplink transmit power; or the UE determines, according to the status of the uplink resource that is scheduled by the second base station for the UE, a maximum uplink transmit power allocated to the first base station, and reports the maximum uplink transmit power to the first base station. Therefore, it is ensured that the maximum uplink transmit power allocated to the first base station is determined according to a resource between base stations, a maximum uplink transmit power can be allocated to each base station properly, and a throughput of the UE and utilization of a network are increased.

Figure 18:
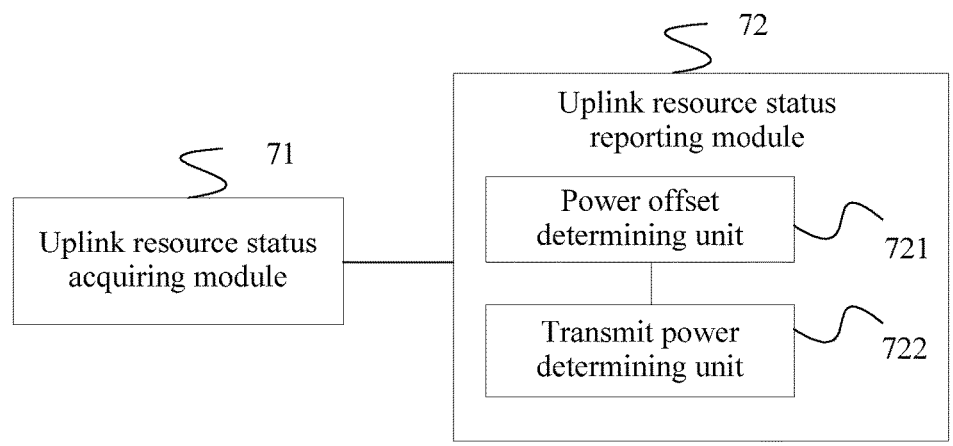
FIG. 18 is a schematic structural diagram of Embodiment 7 of user equipment UE.

FIG. 18 is a schematic structural diagram of Embodiment 7 of user equipment UE according to the present invention. In this embodiment, a first base station is a secondary base station, and a second base station is a master base station. As shown in FIG. 18, the UE provided by this embodiment includes an uplink resource status acquiring module 71 and an uplink resource status reporting module 72.

The uplink resource status acquiring module 71 is configured to acquire a status of an uplink resource that is scheduled by a second base station for the UE.

The uplink resource status reporting module 72 is configured to report the status of the uplink resource that is scheduled by the second base station for the UE, to a first base station, so that the first base station determines, according to the status of the uplink resource, a maximum uplink transmit power that is allocated by the UE to the first base station; or determine, according to the status of the uplink resource that is scheduled by the second base station for the UE, a maximum uplink transmit power that is allocated by the UE to the first base station, and report the maximum uplink transmit power to the first base station.

In this embodiment, the uplink resource status reporting module 72 includes a power offset determining unit 721 and a transmit power determining unit 722.

The power offset determining unit 721 is configured to determine an offset of an uplink transmit power according to the status of the uplink resource that is scheduled by the second base station for the UE, where a value of the offset is preconfigured, or is delivered by the second base station by using network signaling. The transmit power determining unit 722 is configured to add the offset to an initial maximum uplink transmit power that is allocated by the UE to the first base station, and determine that a sum of the offset and the initial maximum uplink transmit power is the maximum uplink transmit power allocated by the UE to the first base station.

In this embodiment, the UE further includes an uplink path loss reporting module and an initial maximum uplink transmit power determining module.

The uplink path loss reporting module is configured to report a downlink path loss between the UE and a base station to the base station, so that the base station determines, according to the downlink path loss, an initial maximum uplink transmit power that is allocated by the UE to the base station. The initial maximum uplink transmit power determining module is configured to determine, according to the downlink path loss between the UE and the base station, the initial maximum uplink transmit power that is allocated by the UE to the base station, and report the initial maximum uplink transmit power to the base station.

Specifically, the uplink path loss reporting module includes a downlink path loss measuring unit and a downlink path loss reporting unit. The downlink path loss measuring unit is configured to measure a downlink path loss between the UE and each base station. The downlink path loss reporting unit is configured to report the downlink path loss between the UE and each base station to the second base station.

The initial maximum uplink transmit power determining module includes a downlink path loss measuring unit, an initial maximum uplink transmit power allocating unit, and an initial maximum uplink transmit power reporting unit.

The downlink path loss measuring unit is configured to measure a downlink path loss between the UE and each base station. The downlink path loss measuring unit is specifically configured to: receive a sounding reference signal sent by each base station, and determine the downlink path loss between the UE and each base station according to a receive power and a transmit power of the sounding reference signal.

The initial maximum uplink transmit power allocating unit is configured to obtain by calculation, from a maximum uplink transmit power of the UE, an initial maximum uplink transmit power that is allocated to each base station. The initial maximum uplink transmit power allocating unit is further configured to add a supplementary offset to the maximum uplink transmit power that is allocated to the first base station.

The initial maximum uplink transmit power reporting unit is configured to report the determined initial maximum uplink transmit power to each base station, or report the determined initial maximum uplink transmit power to the second base station, so that the second base station forwards the determined initial maximum uplink transmit power to each base station.

The initial maximum uplink transmit power determining module acquires, according to a set period, or when the uplink path loss or downlink path loss changes, or when a path loss variation exceeds a set threshold, the initial maximum uplink transmit power that is allocated by the UE to each base station.

The UE provided by this embodiment may be configured to execute the technical solutions provided by method Embodiment 7 to Embodiment 9. The specific implementation manner and technical effect are similar, and therefore are not further described herein.

Figure 19:
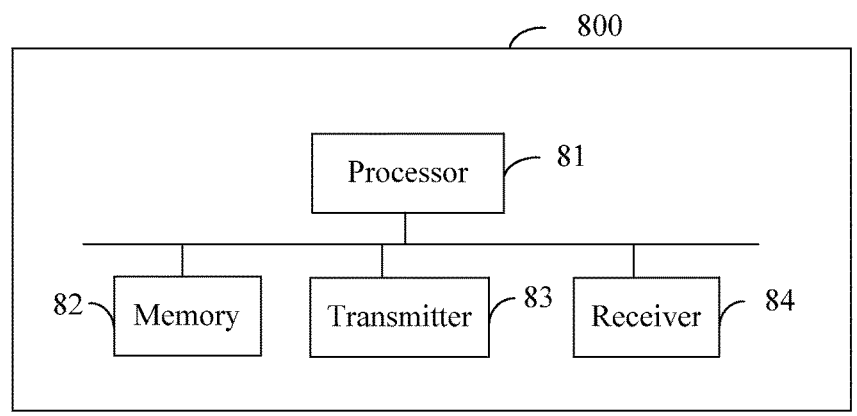
FIG. 19 is a schematic structural diagram of Embodiment 8 of a first base station.

FIG. 19 is a schematic structural diagram of Embodiment 8 of a first base station according to the present invention. As shown in FIG. 19, a first base station 800 provided by this embodiment includes a processor 81 and a memory 82. The first base station 800 may further include a transmitter 83 and a receiver 84. The memory 82, transmitter 83, and receiver 84 are connected to the processor 81 by using a bus. The bus may be one or more physical lines. When the bus is more than one physical line, the bus may be divided into an address bus, a data bus, a control bus, and the like. The memory 82 stores an execution instruction; when the first base station 800 runs, the processor 81 communicates with the memory 82; and the processor 81 invokes the execution instruction in the memory 82 to execute the following operations:

The receiver 84 acquires a maximum uplink transmit power that is allocated by user equipment UE to the first base station, where the maximum uplink transmit power is determined according to a status of an uplink resource that is scheduled by a second base station for the UE.

The processor 81 configures an uplink transmit power for the UE according to the maximum uplink transmit power.

In a possible implementation manner of this embodiment, the first base station is a secondary base station, and the second base station is a master base station.

The receiver 84 is specifically configured to receive, from the second base station or the UE, the status of the uplink resource that is scheduled by the second base station for the UE; and then the processor 81 determines, according to the status of the uplink resource that is scheduled by the second base station for the UE, the maximum uplink transmit power that is allocated by the UE to the first base station. Specifically, the processor 81 determines an offset of an uplink transmit power according to the status of the uplink resource that is scheduled by the second base station for the UE; and then adds the offset to an initial maximum uplink transmit power that is allocated by the UE to the first base station, and determines that a sum of the offset and the initial maximum uplink transmit power is the maximum uplink transmit power allocated by the UE to the first base station. The processor 81 determines the offset of the uplink transmit power when identifying, according to the status of the uplink resource that is scheduled by the second base station for the UE, that an uplink resource scheduled by the second base station for the UE at a current time point is lower than a set threshold, where a value of the offset is preconfigured.

The receiver 84 is further configured to receive, from the second base station or the UE, the maximum uplink transmit power that is allocated by the UE to the first base station, where the maximum uplink transmit power is determined by the second base station or the UE according to the status of the uplink resource that is scheduled by the second base station for the UE.

The status of the uplink resource is semi-persistent scheduling configuration information of the uplink resource that is scheduled for the UE when the second base station establishes a voice service for the UE. The semi-persistent scheduling configuration information includes a semi-persistent scheduling SPS configuration command, an SPS configuration deletion command, an SPS activation instruction, and an SPS deactivation instruction.

The processor 81 is further configured to: after allocating the uplink transmit power to the UE according to the maximum uplink transmit power, when the determined uplink transmit power changes compared with a historical value, or when a variation exceeds a preset threshold, acquire a power headroom of the UE that is recalculated according to the maximum uplink transmit power.

The receiver 84 is further configured to receive preset power information sent by the second base station, where the preset power information includes at least an uplink transmit power that is preconfigured by the second base station at a next time point for the UE; and the processor 81 is configured to determine, according to the preset power information, an uplink transmit power that is configured by the first base station at the next time point for the UE. The preset power information includes: a maximum transmit power of the UE, a maximum transmit power allocated by the UE to the second base station, an uplink control information scheduling status of the UE, a maximum transmit power allocated by the UE to each carrier of the second base station, and an offset of an uplink transmit power used by the second base station.

In this embodiment, the receiver 84 is further configured to acquire the initial maximum uplink transmit power that is allocated by the UE to the first base station, where the initial maximum uplink transmit power is determined according to a downlink path loss or an uplink path loss between each base station and the UE. The processor 81 is configured to allocate the uplink transmit power to the UE according to the initial maximum uplink transmit power.

The receiver 84 is specifically configured to receive the initial maximum uplink transmit power that is allocated by the UE to the first base station and reported by the UE, where the initial maximum uplink transmit power is allocated by the UE from the maximum uplink transmit power of the UE according to a proportion of the downlink path loss between each base station and the UE. Alternatively, the receiver 84 receives the initial maximum uplink transmit power that is allocated by the UE to the first base station and sent by the second base station, where the initial maximum uplink transmit power is allocated by the second base station from the maximum uplink transmit power of the UE according to a proportion of the downlink path loss between each base station and the UE.

In a feasible implementation manner, the receiver 84 receives the downlink path loss of each base station that is reported by the UE; and then, the processor 81 obtains by calculation, from the maximum uplink transmit power of the UE and according to the proportion of each downlink path loss, the initial maximum uplink transmit power that is allocated by the UE to the first base station.

In another feasible implementation manner, the receiver 84 is configured to acquire the uplink path loss between each base station and the UE that is sent by the second base station; and the processor 81 obtains by calculation, from the maximum uplink transmit power of the UE and according to a proportion of each uplink path loss, the initial maximum uplink transmit power that is allocated by the UE to the first base station. Alternatively, the receiver 84 may also receive a sounding reference signal sent by the UE; then, the processor 81 determines an uplink path loss between the first base station and the UE according to a receive power and a transmit power of the sounding reference signal; and the transmitter 83 reports the uplink path loss between the first base station and the UE to the second base station, so that the second base station forwards the uplink path loss to other base stations.

The processor 81 is further configured to add a supplementary offset to the initial maximum uplink transmit power after the initial maximum uplink transmit power that is allocated by the UE to the first base station is acquired. In this embodiment, the receiver 84 acquires, according to a set period, or when the uplink path loss or downlink path loss changes, or when a path loss variation exceeds a set threshold, the initial maximum uplink transmit power that is allocated by the UE to the first base station.

Figure 20:
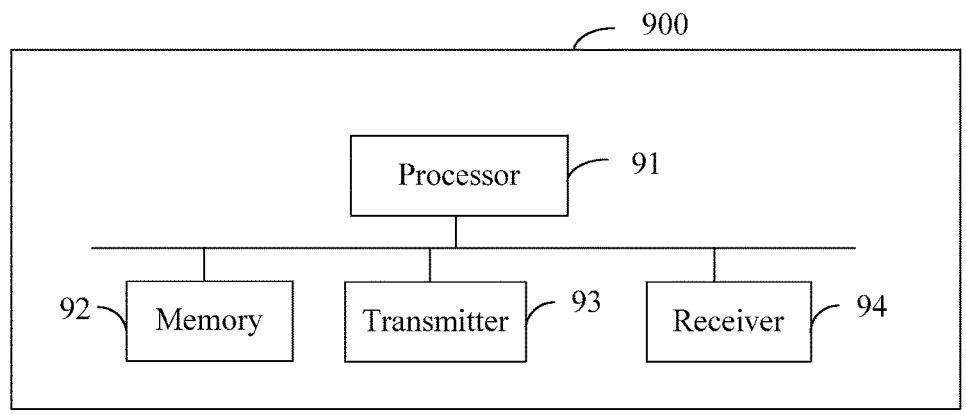
FIG. 20 is a schematic structural diagram of Embodiment 9 of a second base station.

FIG. 20 is a schematic structural diagram of Embodiment 9 of a second base station. As shown in FIG. 20, a second base station 900 provided by this embodiment includes a processor 91 and a memory 92. The second base station 900 may further include a transmitter 93 and a receiver 94. The memory 92, transmitter 93, and receiver 94 are connected to the processor 91 by using a bus. The memory 92 stores an execution instruction; when the second base station 900 runs, the processor 91 communicates with the memory 92; and the processor 91 invokes the execution instruction in the memory 92 to execute the following operations:

The transmitter 93 is configured to provide, for a first base station, a status of an uplink resource that is scheduled by the second base station for UE, so that the first base station determines, according to the status of the uplink resource that is scheduled by the second base station for the UE, a maximum uplink transmit power that is allocated by the UE to the first base station.

The processor 91 is configured to schedule the uplink resource for the UE according to the status of the uplink resource.

In a possible implementation manner of this embodiment, the first base station is a secondary base station, and the second base station is a master base station.

The transmitter 93 is specifically configured to: send the status of the uplink resource that is scheduled by the second base station for the UE, to the first base station; or send the status of the uplink resource that is scheduled by the second base station for the UE, to the first base station through the UE. Specifically, the transmitter 93 may send the status of the uplink resource that is scheduled by the second base station for the UE, to the UE by using a MAC CE, an RRC message, or uplink control information, so that the UE sends the status of the uplink resource to the first base station.

Optionally, when establishing a voice service for the UE, the processor 91 may also configure semi-persistent scheduling of the uplink resource for the UE; and then the transmitter 93 sends semi-persistent scheduling configuration information to the first base station, or sends semi-persistent scheduling configuration information to the UE, so that the UE sends the semi-persistent scheduling configuration information to the first base station. The semi-persistent scheduling configuration information includes an SPS configuration command, an SPS configuration deletion command, an SPS activation instruction, and an SPS deactivation instruction.

The processor 91 is further configured to configure preset power information for the second base station, where the preset power information includes at least an uplink transmit power that is preconfigured by the second base station at a next time point for the UE; and the transmitter 93 sends the preset power information to the first base station, so that the first base station determines, according to the preset power information, an uplink transmit power that is configured by the first base station at the next time point for the UE. The preset power information includes: a maximum transmit power of the UE, a maximum transmit power allocated by the UE to the second base station, an uplink control information scheduling status of the UE, a maximum transmit power allocated by the UE to each carrier of the second base station, and an offset of an uplink transmit power used by the second base station.

The receiver 94 is configured to acquire an initial maximum uplink transmit power that is allocated by the UE to the second base station, where the initial maximum uplink transmit power is determined according to a downlink path loss or an uplink path loss between each base station and the UE; and the processor 91 allocates the uplink transmit power to the UE according to the initial maximum uplink transmit power.

Specifically, the receiver 94 is configured to receive the initial maximum uplink transmit power that is allocated by the UE to the second base station and reported by the UE, where the initial maximum uplink transmit power is allocated by the UE from the maximum uplink transmit power of the UE according to a proportion of the downlink path loss between each base station and the UE. Alternatively, the receiver 94 receives an initial maximum uplink transmit power that is allocated by the UE to each base station and reported by the UE. Certainly, the receiver 94 may also receive the downlink path loss of each base station that is reported by the UE, and then the processor 91 obtains by calculation, from the maximum uplink transmit power of the UE and according to the proportion of each downlink path loss, the initial maximum uplink transmit power that is allocated by the UE to each base station, and the transmitter 93 sends each initial maximum uplink transmit power to a corresponding base station.

In a feasible implementation manner, the receiver 94 is configured to acquire the uplink path loss between each base station and the UE that is sent by each base station. The processor 91 obtains by calculation, from the maximum uplink transmit power of the UE and according to a proportion of each uplink path loss, the initial maximum uplink transmit power that is allocated by the UE to each base station. The transmitter 93 sends each initial maximum uplink transmit power to a corresponding base station.

The receiver 94 is further configured to receive a sounding reference signal sent by the UE; and then the processor 91 determines an uplink path loss between the second base station and the UE according to a receive power and a transmit power of the sounding reference signal.

The processor 91 is further configured to add a supplementary offset to an initial maximum uplink transmit power that is allocated to the secondary base station.

In this embodiment, the receiver 94 acquires, according to a set period, or when the uplink path loss or downlink path loss changes, or when a path loss variation exceeds a set threshold, the initial maximum uplink transmit power that is allocated by the UE to the second base station.

Figure 21:
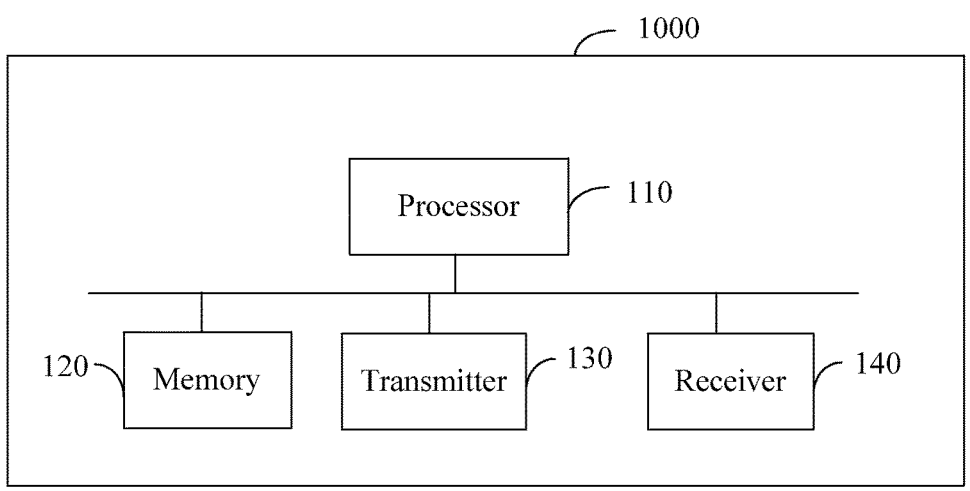
FIG. 21 is a schematic structural diagram of Embodiment 10 of user equipment UE.

FIG. 21 is a schematic structural diagram of Embodiment 10 of user equipment UE according to the present invention. As shown in FIG. 21, UE 1000 provided by this embodiment includes a processor 110 and a memory 120. The UE 1000 may further include a transmitter 130 and a receiver 140. The memory 120, transmitter 130, and receiver 140 are connected to the processor 110 by using a bus. The memory 120 stores an execution instruction; when the UE 1000 runs, the processor 110 communicates with the memory 120; and the processor 110 invokes the execution instruction in the memory 120 to execute the following operations:

The receiver 140 is configured to acquire a status of an uplink resource that is scheduled by a second base station for the UE.

The transmitter 130 reports the status of the uplink resource that is scheduled by the second base station for the UE, to a first base station, so that the first base station determines, according to the status of the uplink resource, a maximum uplink transmit power that is allocated by the UE to the first base station; or the processor 110 determines, according to the status of the uplink resource that is scheduled by the second base station for the UE, a maximum uplink transmit power that is allocated by the UE to the first base station, and reports the maximum uplink transmit power to the first base station through the transmitter 130.

In this embodiment, the first base station is a secondary base station, and the second base station is a master base station.

The processor 110 is specifically configured to determine an offset of an uplink transmit power according to the status of the uplink resource that is scheduled by the second base station for the UE; and add the offset to an initial maximum uplink transmit power that is allocated by the UE to the first base station, and determine that a sum of the offset and the initial maximum uplink transmit power is the maximum uplink transmit power allocated by the UE to the first base station, where a value of the offset is preconfigured or is delivered by the second base station by using network signaling.

The receiver 140 is further configured to receive the status that is of the uplink resource and is sent by using a MAC CE, an RRC message, or uplink control information by the second base station, or receive an SPS configuration command, an SPS configuration deletion command, an SPS activation instruction, and an SPS deactivation instruction that are sent by the second base station; the processor 110 uses the SPS configuration command, the SPS configuration deletion command, the SPS activation instruction, and the SPS deactivation instruction as the status of the uplink resource. Alternatively, the processor 110 identifies whether the second base station does not schedule the uplink resource within a set time, and determines the status of the uplink resource according to an identification result.

The transmitter 130 is further configured to report a downlink path loss between the UE and a base station to the base station, so that the base station determines, according to the downlink path loss, an initial maximum uplink transmit power that is allocated by the UE to the base station.

The processor 110 determines, according to a downlink path loss between each base station and a base station, an initial maximum uplink transmit power that is allocated by the UE to the base station, and reports the initial maximum uplink transmit power to the base station through the transmitter 130. The processor 110 is further configured to measure a downlink path loss between the UE and each base station, and report the downlink path loss between the UE and each base station to the second base station through the transmitter 130.

Specifically, the processor 110 is further configured to measure a downlink path loss between the UE and each base station; then obtain by calculation, from a maximum uplink transmit power of the UE and according to a proportion of the downlink path loss between the UE and each base station, an initial maximum uplink transmit power allocated to each base station; and report the determined initial maximum uplink transmit power to each base station through the transmitter 130, or report the determined initial maximum uplink transmit power to the second base station, so that the second base station forwards the determined initial maximum uplink transmit power to each base station.

Specifically, the downlink path loss between the UE and each base station is measured in the following manner: First, the receiver 140 receives a sounding reference signal sent by each base station; and then the processor 110 determines the downlink path loss between the UE and each base station according to a receive power and a transmit power of the sounding reference signal.

In this embodiment, after the processor 110 obtains by calculation, from the maximum uplink transmit power of the UE and according to the proportion of the downlink path loss between the UE and each base station, the initial maximum uplink transmit power allocated to each base station, the processor 110 is further configured to add a supplementary offset to the maximum uplink transmit power that is allocated to the first base station.

The receiver 140 acquires, according to a set period, or when the uplink path loss or downlink path loss changes, or when a path loss variation exceeds a set threshold, the initial maximum uplink transmit power that is allocated by the UE to each base station.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features of the technical solutions, without departing from the scope of the technical solutions of the embodiments of the present invention.

What is claimed is:

1. A method, comprising:
    acquiring, by a secondary base station, a maximum uplink transmit power that is allocated by a user equipment (UE) to the secondary base station, wherein the maximum uplink transmit power is determined according to a status of an uplink resource that is scheduled by a master base station for the UE; and
    configuring, by the secondary base station, an uplink transmit power for the UE according to the maximum uplink transmit power.

2. The method according to claim 1, wherein the acquiring, by a secondary base station, a maximum uplink transmit power that is allocated by UE to the secondary base station, comprises:
    receiving, by the secondary base station, from the master base station or the UE, the status of the uplink resource that is scheduled by the master base station for the UE; and
    obtaining, by the secondary base station, according to the status of the uplink resource that is scheduled by the master base station for the UE, the maximum uplink transmit power that is allocated by the UE to the secondary base station.

3. The method according to claim 1, wherein the acquiring, by a secondary base station, a maximum uplink transmit power that is allocated by UE to the secondary base station, comprises:
    receiving, by the secondary base station, from the master base station or the UE, the maximum uplink transmit power that is allocated by the UE to the secondary base station, wherein the maximum uplink transmit power is based on the status of the uplink resource that is scheduled by the master base station for the UE.

4. The method according to claim 1, further comprising:
    receiving, by the secondary base station, preset power information sent by the master base station, wherein the preset power information comprises an uplink transmit power that is preconfigured by the master base station at a next time point for the UE; and
    configuring, by the secondary base station, according to the preset power information, an uplink transmit power at the next time point for the UE.

5. The method according to claim 1, further comprising:
    acquiring, by the secondary base station, an initial maximum uplink transmit power that is allocated by the UE to the secondary base station, wherein the initial maximum uplink transmit power is based on a downlink path loss or an uplink path loss between each base station and the UE; and
    configuring, by the secondary base station, the uplink transmit power for the UE further according to the initial maximum uplink transmit power.

6. A method, comprising:
    acquiring, by a user equipment (UE), a status of an uplink resource that is scheduled by a master base station for the UE; and
    reporting, by the UE to a secondary base station, the status of the uplink resource that is scheduled by the master base station for the UE, and receiving, by the UE from the secondary base station, an uplink transmit power that is configured by the secondary base station according to a maximum uplink transmit power that is based on the status of the uplink resource; or
    determining, by the UE, according to the status of the uplink resource that is scheduled by the master base station for the UE, a maximum uplink transmit power that is allocated by the UE to the secondary base station, and reporting, by the UE to the secondary base station, the maximum uplink transmit power.

7. The method according to claim 6, wherein the acquiring, by the UE, a status of an uplink resource that is scheduled by a master base station for the UE comprises:
    receiving, by the UE, the status of the uplink resource, the status of the uplink resource being sent by the master base station using a media access control element (MAC) control element (CE), a radio resource control (RRC) message, or uplink control information; or
    receiving, by the UE, a semi-persistent scheduling (SPS) configuration command, an SPS configuration deletion command, an SPS activation instruction, and an SPS deactivation instruction that are sent by the master base station, and using the commands and instructions as the status of the uplink resource; or
    identifying, by the UE, whether the master base station does not schedule the uplink resource within a set time, and determining the status of the uplink resource according to an identification result.

8. The method according to claim 6, further comprising:
    reporting, by the UE to a selected base station, a downlink path loss between the UE and the selected base station; or
    determining, by the UE, according to a downlink path loss between the UE and a selected base station, an initial maximum uplink transmit power that is allocated by the UE to the selected base station, and reporting, by the UE to the selected base station, the initial maximum uplink transmit power.

9. The method according to claim 8, wherein the determining, by the UE, according to a downlink path loss between the UE and a base station, an initial maximum uplink transmit power that is allocated by the UE to the selected base station, and reporting, by the UE to the selected base station, the initial maximum uplink transmit power, comprises:
measuring, by the UE, a downlink path loss between the UE and each base station;
obtaining, by the UE by calculation, from a maximum uplink transmit power of the UE and according to a proportion of the downlink path loss between the UE and each base station, an initial maximum uplink transmit power allocated to each base station; and
reporting, by the UE, the determined initial maximum uplink transmit power to each base station, or reporting the determined initial maximum uplink transmit power to the master base station.

10. The method according to claim 6, wherein the method comprises reporting, by the UE to a secondary base station, the status of the uplink resource that is scheduled by the master base station for the UE, and receiving, by the UE from the secondary base station, a uplink transmit power that is configured by the secondary base station according to a maximum uplink transmit power that is based on the status of the uplink resource.

11. The method according to claim 6, wherein the method comprises determining, by the UE, according to the status of the uplink resource that is scheduled by the master base station for the UE, a maximum uplink transmit power that is allocated by the UE to the secondary base station, and reporting by the UE to the secondary base station, the maximum uplink transmit power.

12. The method according to claim 11, wherein the determining, by the UE, according to the status of the uplink resource that is scheduled by the master base station for the UE, a maximum uplink transmit power that is allocated by the UE to the secondary base station, comprises:
determining, by the UE, an offset of an uplink transmit power according to the status of the uplink resource that is scheduled by the master base station for the UE; and
adding, by the UE, the offset to an initial maximum uplink transmit power that is allocated by the UE to the secondary base station, and determining that a sum of the offset and the initial maximum uplink transmit power is the maximum uplink transmit power allocated by the UE to the secondary base station.

13. A base station, comprising:
a processor; and
a computer-readable storage medium storing a program to be executed by the processor when the base station is acting as a secondary base station, the program including instructions for:
acquiring a maximum uplink transmit power that is allocated by a user equipment (UE) to the base station, wherein the maximum uplink transmit power is determined according to a status of an uplink resource that is scheduled by a master base station for the UE; and
configuring an uplink transmit power for the UE according to the maximum uplink transmit power.

14. The base station according to claim 13, further comprising:
a receiver, configured to receive, from the second base station or the UE, the status of the uplink resource that is scheduled by the second base station for the UE;
wherein the program further includes instructions for obtaining, according to the status of the uplink resource that is scheduled by the second base station for the UE, the maximum uplink transmit power that is allocated by the UE to the base station.

15. The base station according to claim 13, further comprising a receiver, configured to receive, from the master base station or the UE, the maximum uplink transmit power that is allocated by the UE to the base station, wherein the maximum uplink transmit power is based on the status of the uplink resource that is scheduled by the master base station for the UE.

16. The base station according to claim 13, further comprising:
a receiver, configured to receive preset power information sent by the master base station, wherein the preset power information comprises at least an uplink transmit power that is preconfigured by the master base station at a next time point for the UE;
wherein the program further includes instructions for configuring, according to the preset power information, an uplink transmit power at the next time point for the UE.

17. The base station according to claim 13, wherein the program further includes instructions for:
acquiring an initial maximum uplink transmit power that is allocated by the UE to the base station, wherein the initial maximum uplink transmit power is based on a downlink path loss or an uplink path loss between each base station and the UE; and
configuring the uplink transmit power for the UE further according to the initial maximum uplink transmit power.

18. A user equipment (UE), comprising:
a processor; and
a computer-readable storage medium storing a program to be executed by the processor, the program including instructions for:
acquiring a status of an uplink resource that is scheduled by a master base station for the UE; and
reporting to a secondary base station, the status of the uplink resource that is scheduled by the master base station for the UE, and receiving from the secondary base station, an uplink transmit power that is configured by the secondary base station according to a maximum uplink transmit power that is based on the status of the uplink resource; or
determining, according to the status of the uplink resource that is scheduled by the second base station for the UE, a maximum uplink transmit power that is allocated by the UE to the secondary base station, and reporting to the secondary base station, the maximum uplink transmit power.

19. The UE according to claim 18, wherein the instructions for acquiring a status of an uplink resource comprises instructions for:
receiving the status that is of the uplink resource and is sent by using a media access control element (MAC) control element (CE), a radio resource control (RRC) message, or uplink control information by the master base station; or
receiving a semi-persistent scheduling (SPS configuration command, an SPS configuration deletion command, an SPS activation instruction, and an SPS deactivation instruction that are sent by the master base station, and use the commands and instructions as the status of the uplink resource; or identifying whether the master base station does not schedule the uplink resource within a set time, and determine the status of the uplink resource according to an identification result.

20. The UE according to claim 18, wherein the program further includes instructions for:
reporting to a selected base station, a downlink path loss between the UE and a selected base station; or
determining, according to a downlink path loss between the UE and a base station, an initial maximum uplink transmit power that is allocated by the UE to the base station, and reporting to the selected base station, the initial maximum uplink transmit power.

21. The UE according to claim 20, wherein the instructions for determining, according to a downlink path loss between the UE and a base station, an initial maximum uplink transmit power that is allocated by the UE to the base station, and reporting to the selected base station, the initial maximum uplink transmit power comprises instructions for:
measuring a downlink path loss between the UE and each base station;
calculating, from a maximum uplink transmit power of the UE, an initial maximum uplink transmit power that is allocated to each base station; and
reporting the determined initial maximum uplink transmit power to each base station, or reporting the determined initial maximum uplink transmit power to the master base station.

22. The UE according to claim 18, wherein the instructions comprises reporting to a secondary base station, the status of the uplink resource that is scheduled by the master base station for the UE, and receiving from the secondary base station, a uplink transmit power that is configured by the secondary base station according to a maximum uplink transmit power that is based on the status of the uplink resource.

23. The UE according to claim 18, wherein the instructions comprises determining, according to the status of the uplink resource that is scheduled by the master base station for the UE, a maximum uplink transmit power that is allocated by the UE to the secondary base station, and reporting to the secondary base station, the maximum uplink transmit power.

24. The UE according to claim 23, wherein the instructions for determining, according to the status of the uplink resource that is scheduled by the second base station for the UE, a maximum uplink transmit power that is allocated by the UE to the secondary base station comprises instructions for:
determining an offset of an uplink transmit power according to the status of the uplink resource that is scheduled by the master base station for the UE; and
adding the offset to an initial maximum uplink transmit power that is allocated by the UE to the secondary base station, and determining that a sum of the offset and the initial maximum uplink transmit power is the maximum uplink transmit power allocated by the UE to the secondary base station.

* * * * *